United States Patent [19]
Berkich

[11] Patent Number: 5,476,301
[45] Date of Patent: Dec. 19, 1995

[54] CARGO SECURING SYSTEM INCLUDING AN ADJUSTABLE AND EXTENSIBLE RACK FOR TRUCKS

[76] Inventor: Ron S. Berkich, 185 Dogwood Dr., Akron, Pa. 17501

[21] Appl. No.: 162,965

[22] Filed: Dec. 8, 1993

[51] Int. Cl.⁶ .................................................. B60P 3/00
[52] U.S. Cl. .............. 296/3; 224/405; 224/494; 224/542; 224/510; 224/403
[58] Field of Search ................. 296/3, 7, 8, 26, 296/27; 224/42.01, 42.42, 42.45 R, 320, 321

[56] References Cited

U.S. PATENT DOCUMENTS

| | | | |
|---|---|---|---|
| 2,720,414 | 10/1955 | Hart | 296/3 X |
| 3,743,345 | 7/1973 | Eckman et al. | 296/27 X |
| 4,405,170 | 9/1983 | Raya | 296/3 X |
| 4,423,899 | 1/1984 | Langmead | 296/3 |
| 4,600,232 | 7/1986 | Phillips | 296/3 |
| 4,659,131 | 4/1987 | Flournoy, Jr. | 296/3 |
| 4,722,646 | 2/1988 | McIntyre . | |
| 4,762,303 | 8/1988 | Thomas . | |
| 4,772,165 | 9/1988 | Bartkus . | |
| 5,009,337 | 4/1991 | Bimbi | 224/320 X |
| 5,037,152 | 8/1991 | Hendricks | 296/3 |
| 5,108,141 | 4/1992 | Anderson | 296/3 |
| 5,143,415 | 9/1992 | Boudah | 296/3 |
| 5,152,570 | 10/1992 | Hood . | |
| 5,190,337 | 3/1993 | McDaniel . | |

*Primary Examiner*—Dean Kramer
*Attorney, Agent, or Firm*—Nixon & Vanderhye

[57] ABSTRACT

A cargo securing system includes a forward cab protector rack and a rear tailgate rack interconnected by side beams. The forward rack includes upper and lower corner supports each having sections with an extension member telescopically secured within and pinned to one another whereby the rack extends above the truck cab. The upper front section can be removed and stored in a horizontal position. The rear rack includes corner supports each having upper and lower sections movable relative to one another to provide a rack at a height equal to the height of the sides of the truck bed or a rack extending above the truck bed sides, respectively. Cross beams extend laterally between the upright corner supports and side rails extend between the front and rear corner supports at adjusted elevations. The cross beams, side rails and extended upright supports may be stored by pinned connections with the supports for the rack secured to the sides of the truck bed.

25 Claims, 18 Drawing Sheets

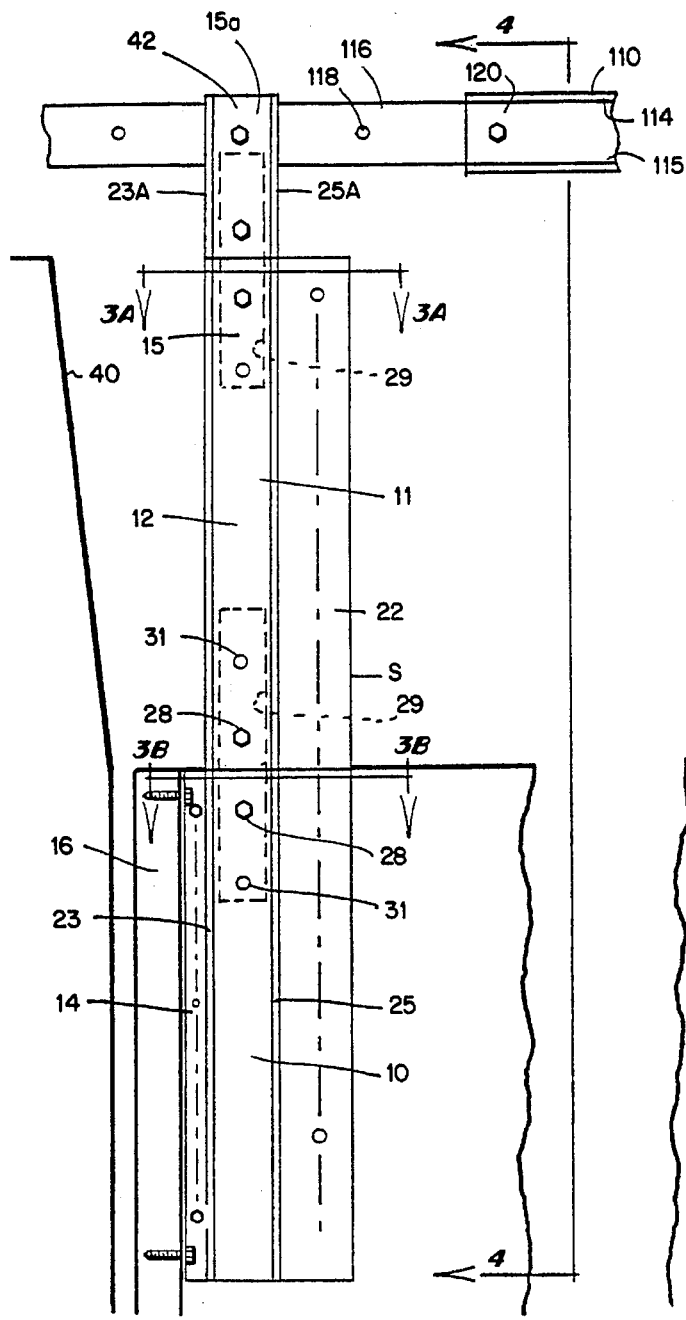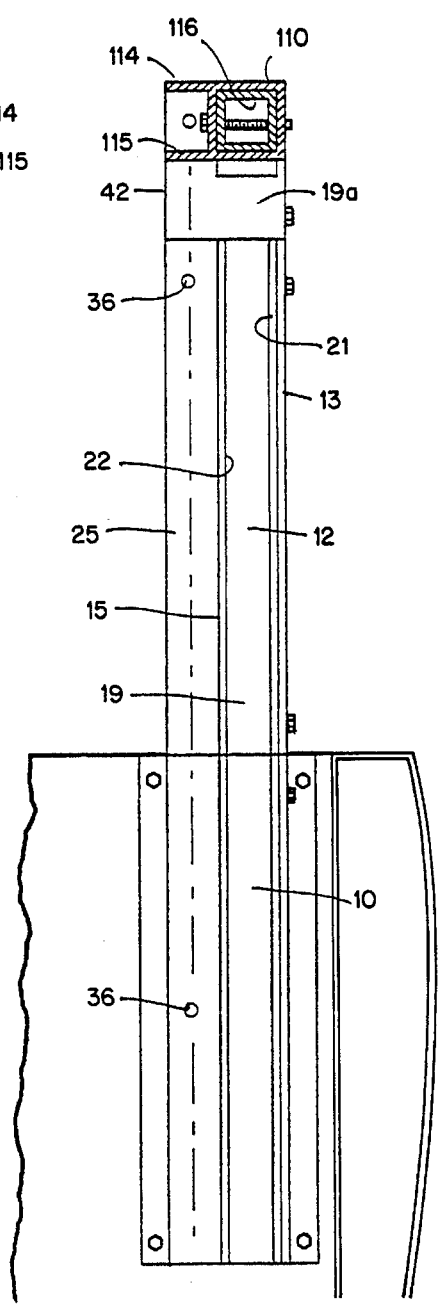

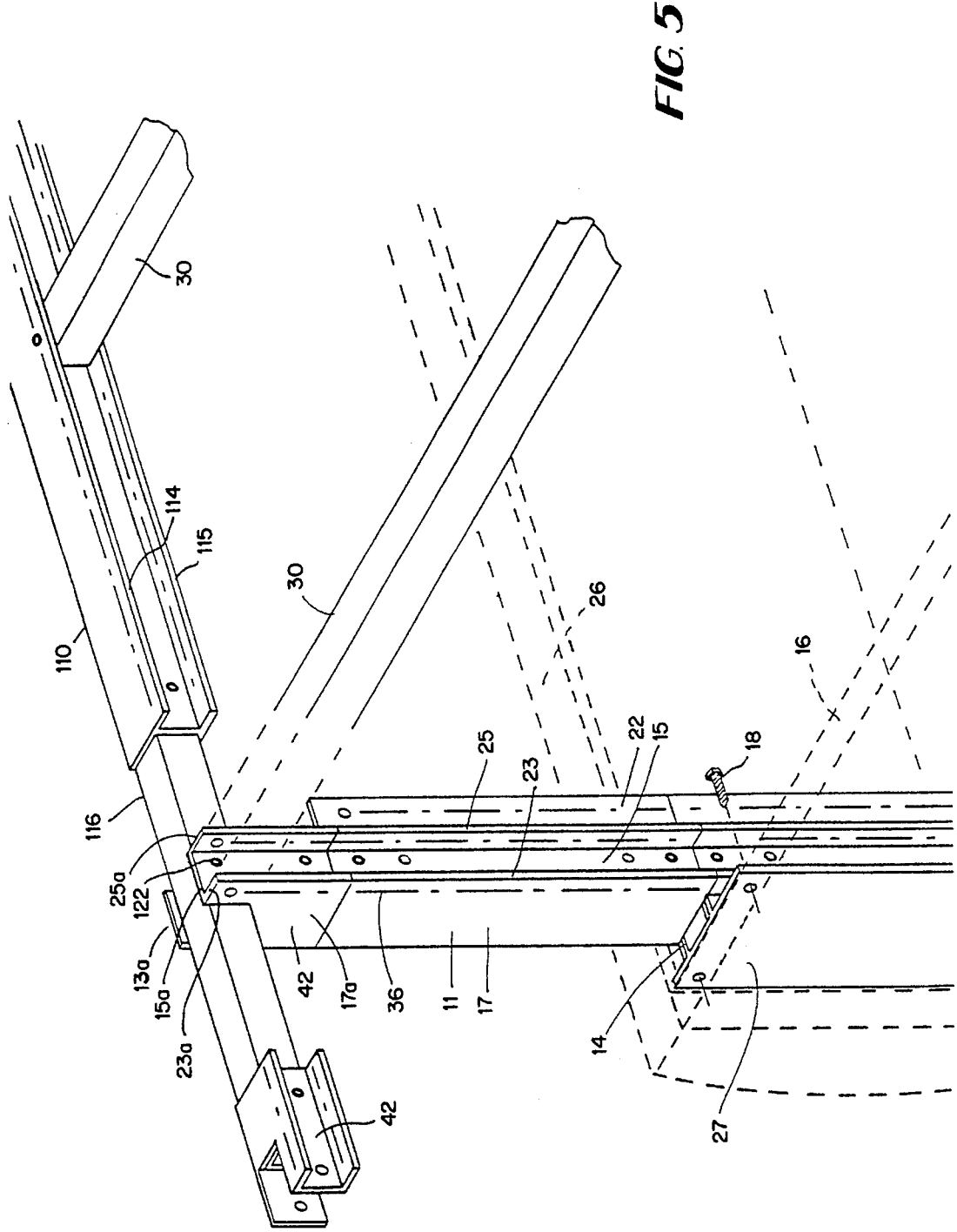

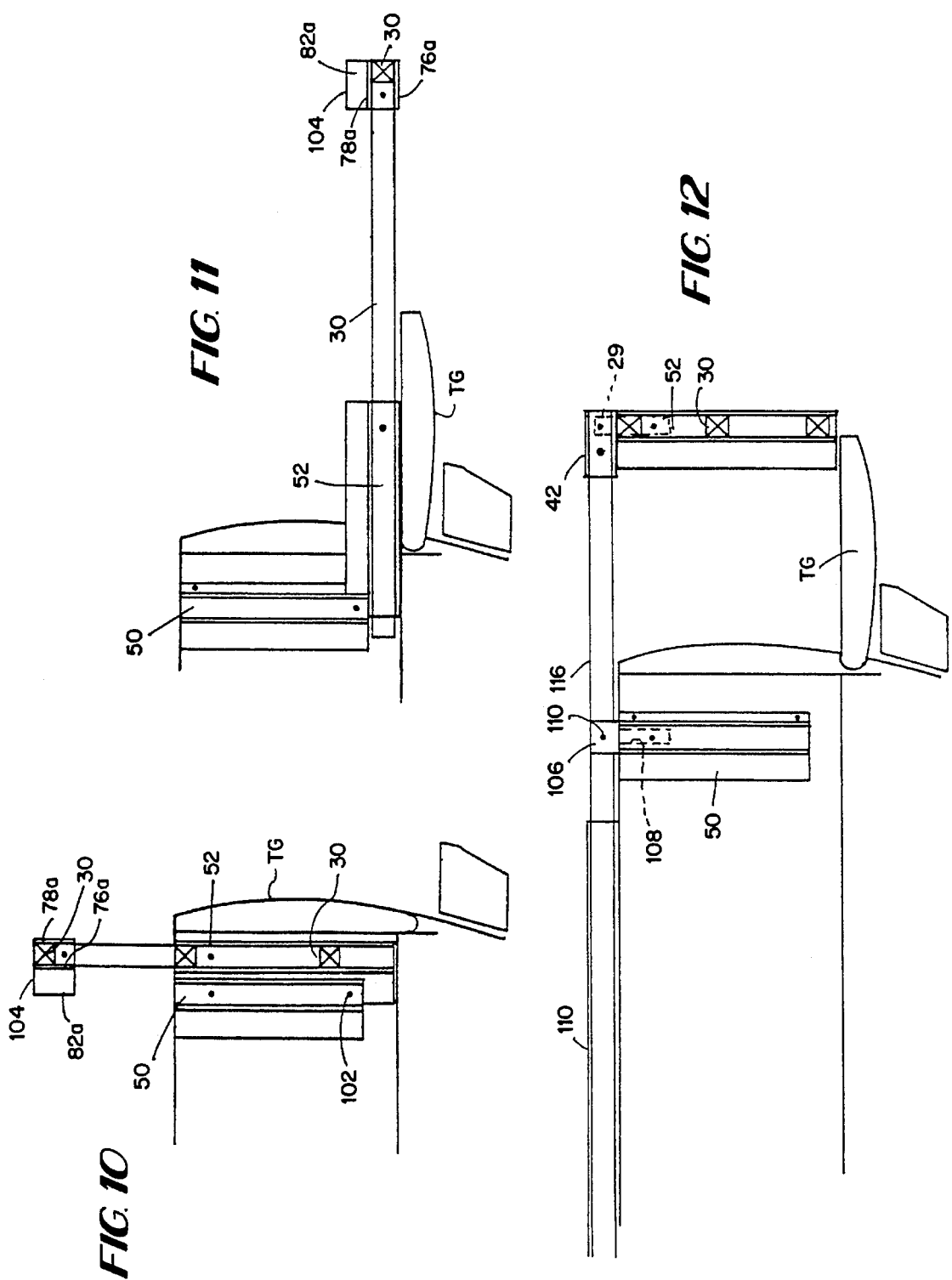

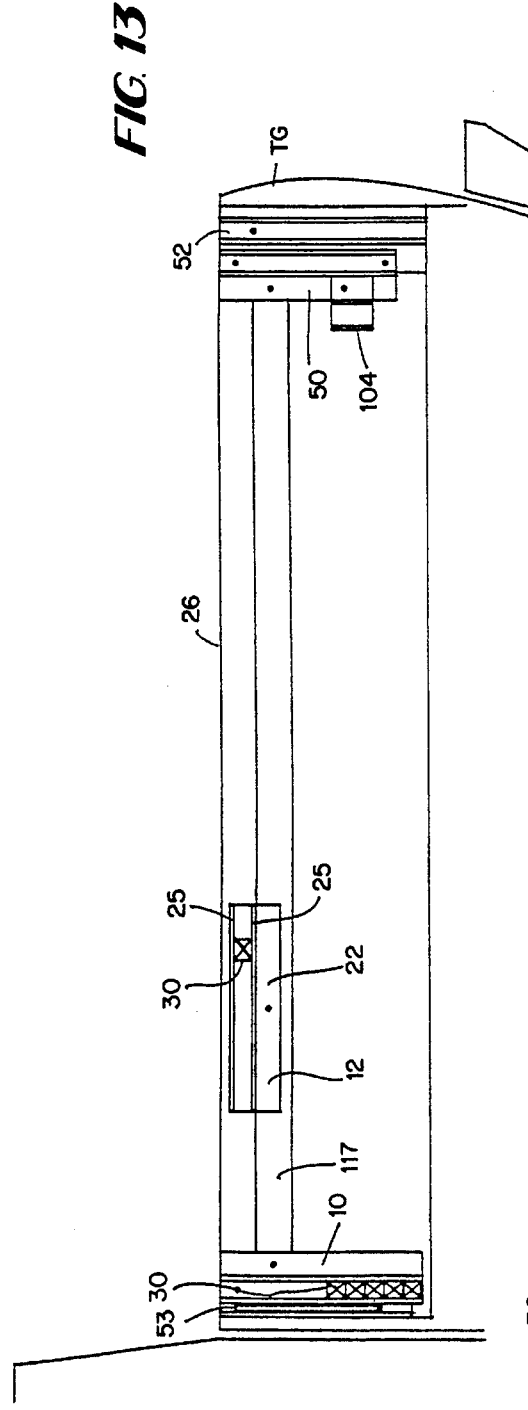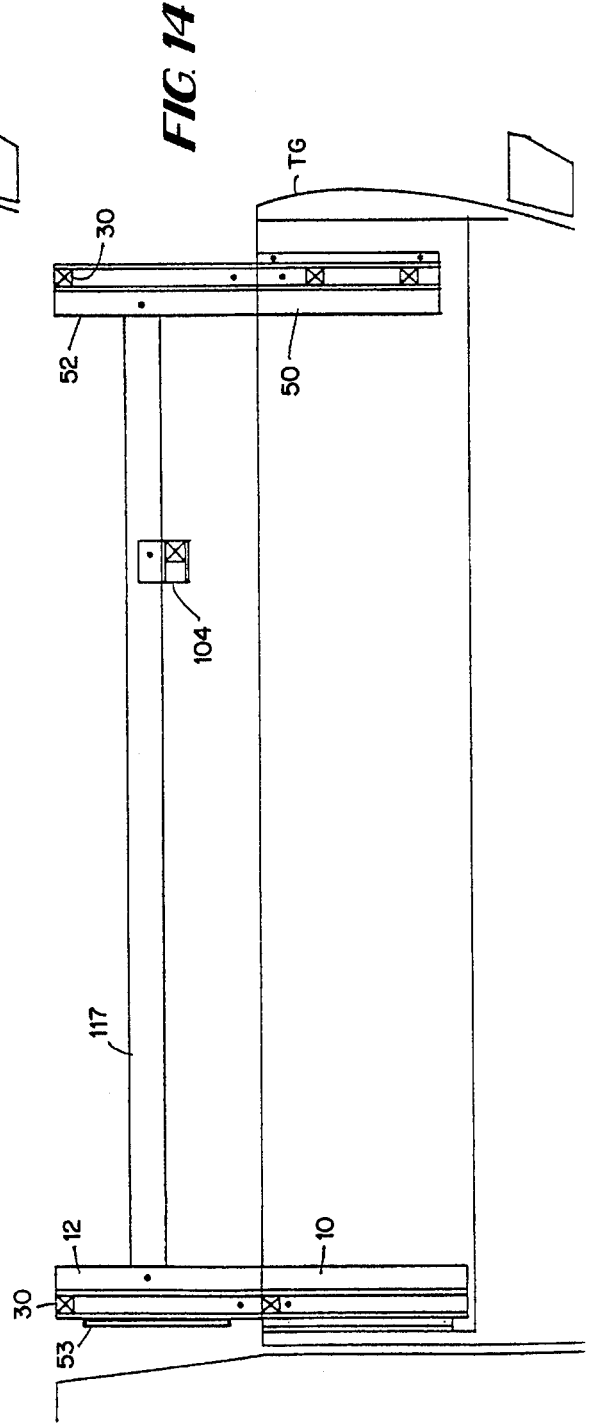

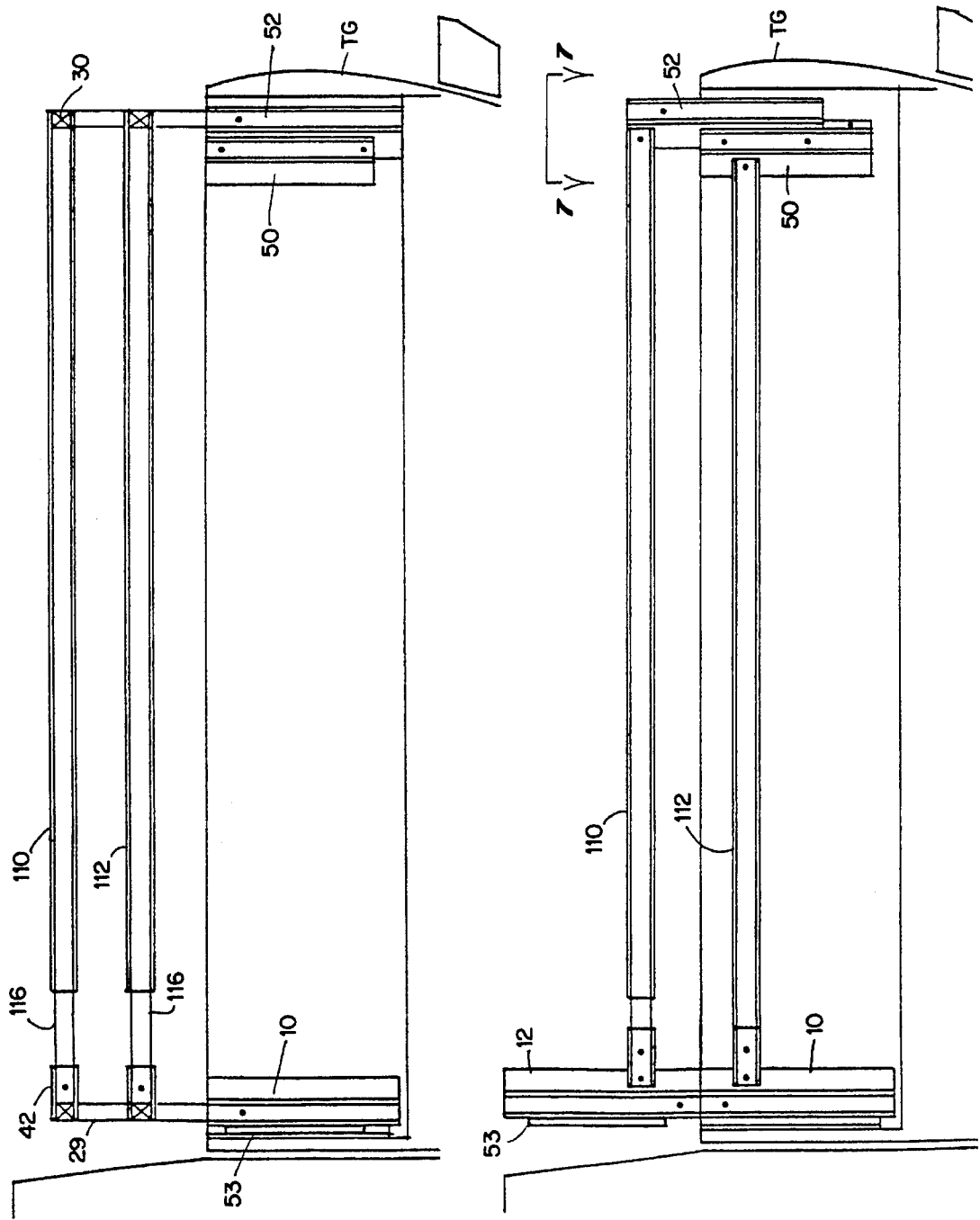

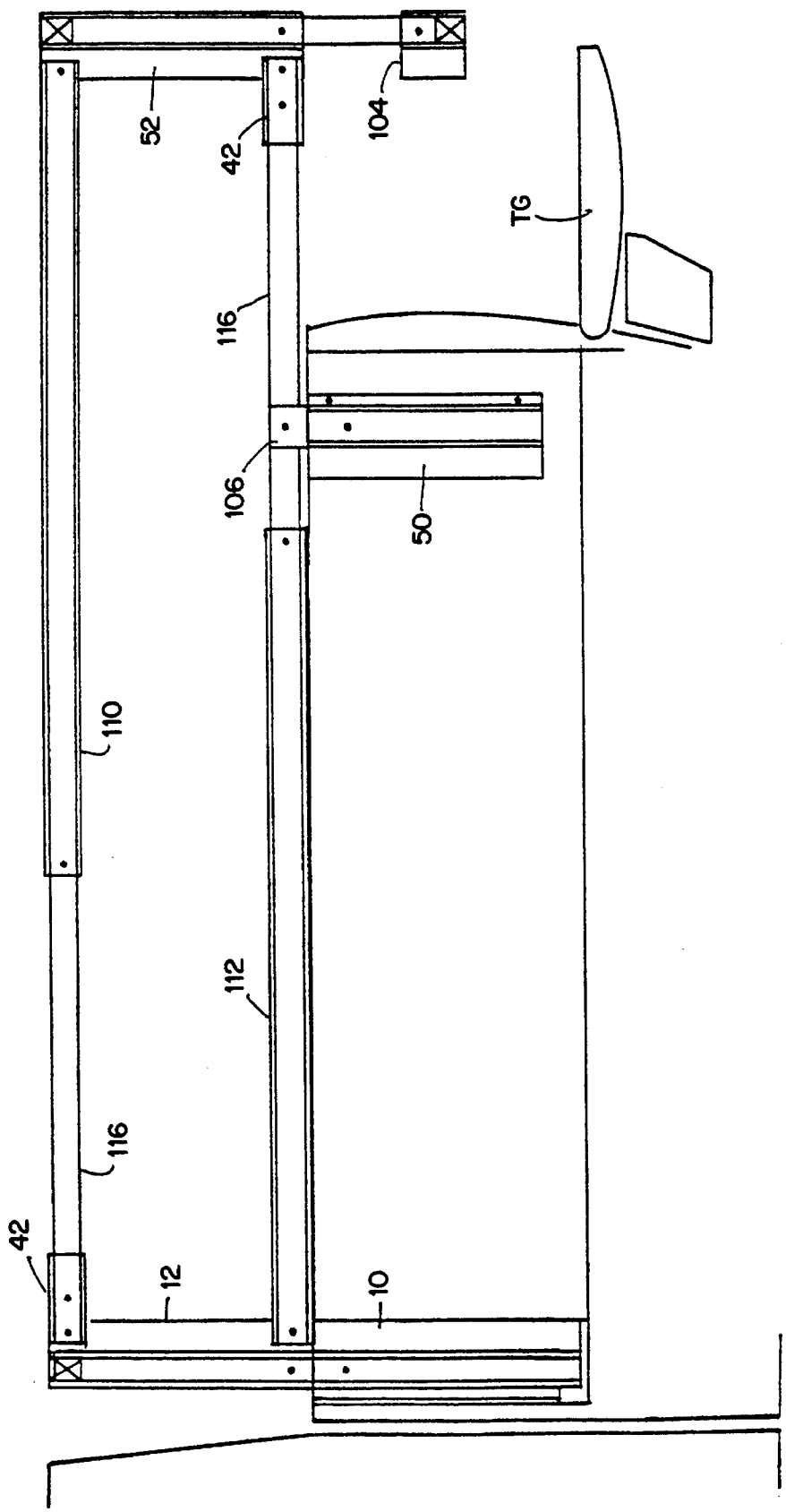

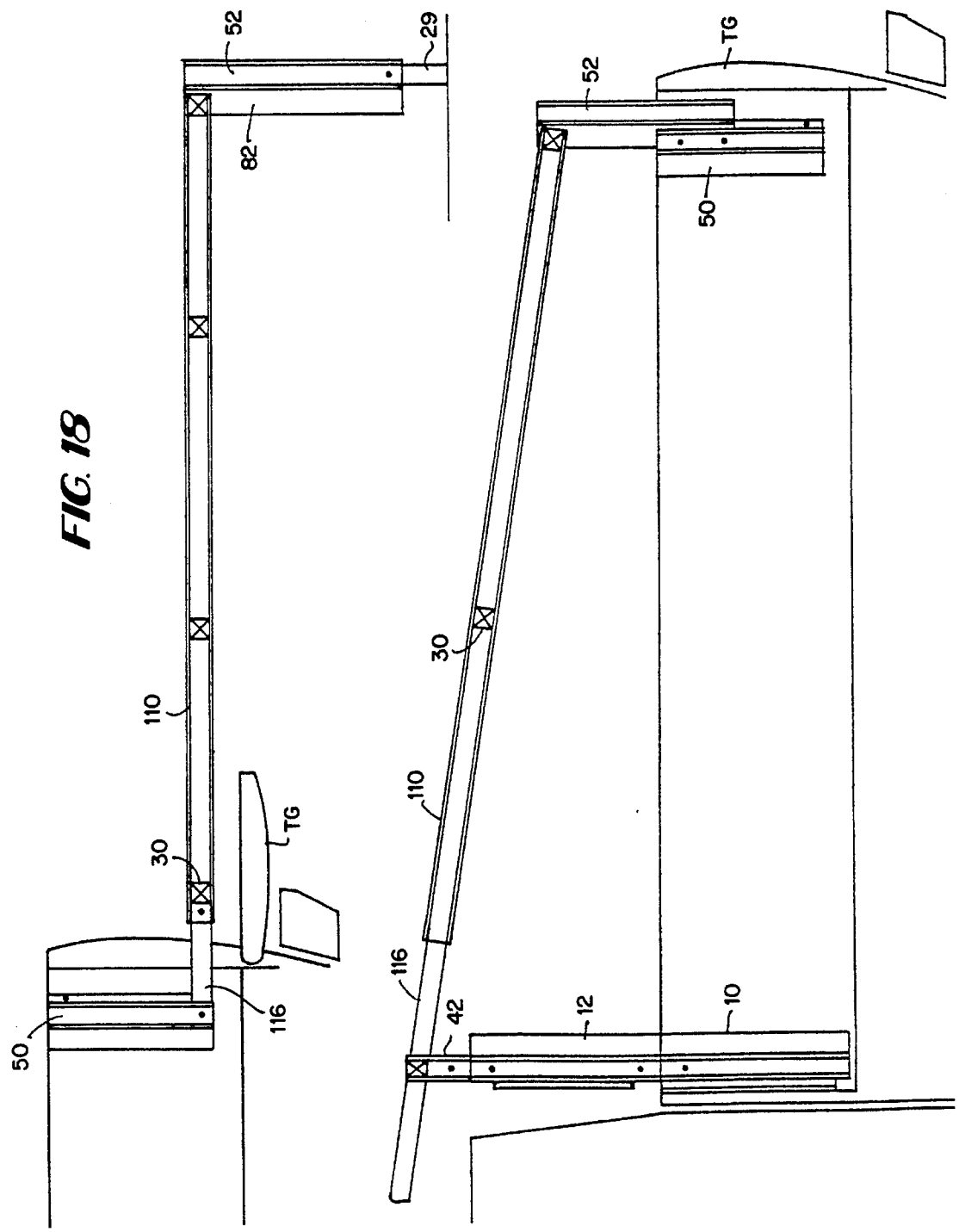

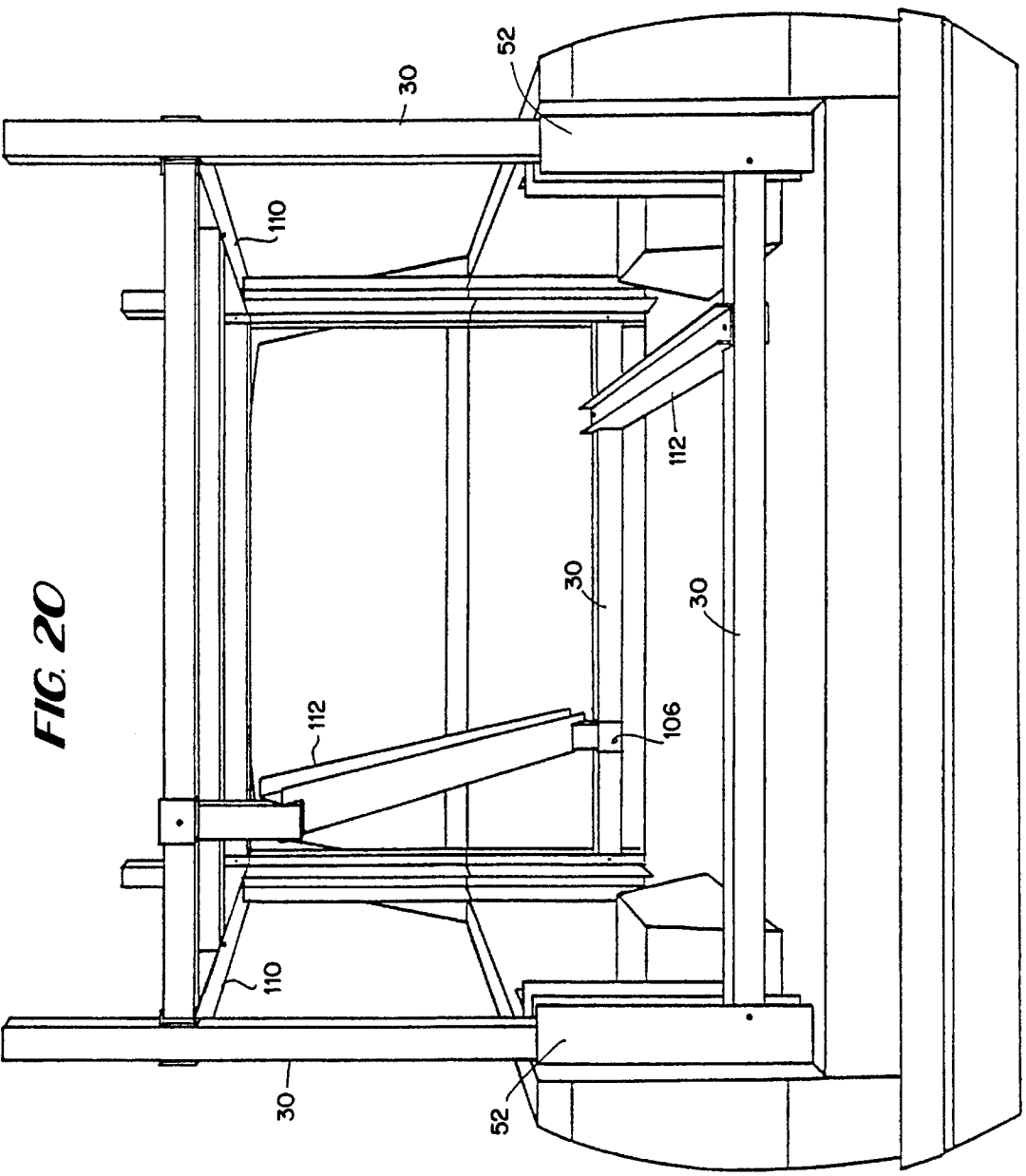

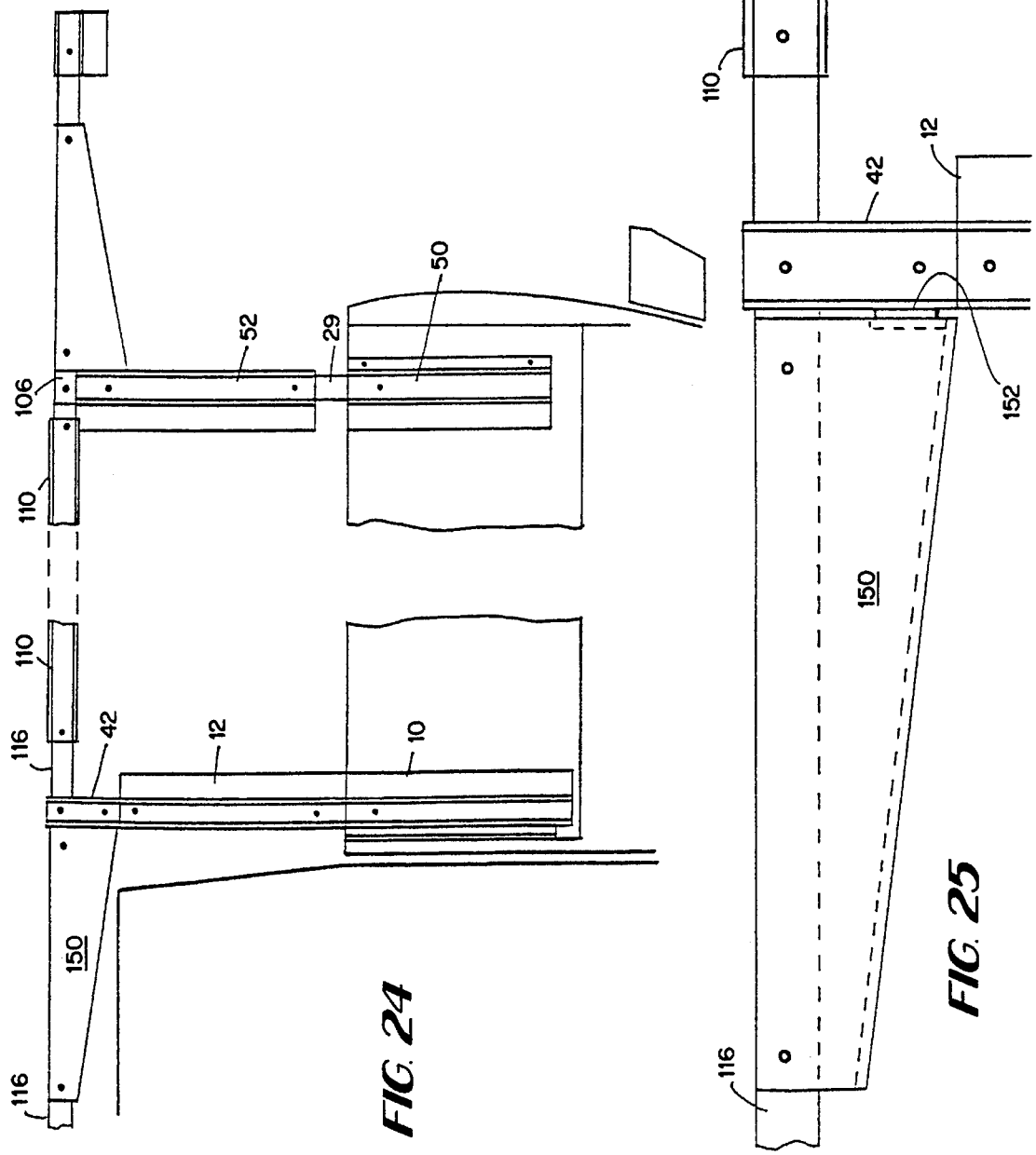

CARGO SECURING SYSTEM INCLUDING AN ADJUSTABLE AND EXTENSIBLE RACK FOR TRUCKS

FIELD OF THE INVENTION

The present invention relates to a cargo securing system for trucks and particularly to a truck rack for mounting in the bed of a truck. More particularly, the truck rack includes modular components for adjusting the rack in height and extent, as well as in configuration, for supporting and securing a variety of different loads.

BACKGROUND AND SUMMARY OF THE INVENTION

Truck racks are typically used to haul long, cumbersome objects, for is example, lumber, that are too long or incompatibly shaped for hauling in the bed of a pickup truck. Racks of this type are also typically fixed to the top of the truck and bed and remain fixed until the rack is no longer needed. The racks are usually too bulky to be conveniently stored. Also, substantial labor, lifting and time is necessary to mount and demount the rack relative to the truck bed. Prior truck racks also occupy substantial space within the truck bed, hence limiting the available space for carrying cargo.

The present invention provides a cargo securing system for a truck comprised of a truck rack mounted to the truck along the sides of the truck bed, not on top of the truck bed, and in a manner which occupies little of the available space within the truck bed, yet enables the rack to be adjustable in height and extensible longitudinally for carrying various and differently shaped cargoes. Moreover, the present truck rack, once installed, enables placement of a truck bed cover, truck cap or enclosure, or the occasional placement of a truck camper without removing the rack from the truck bed. The rack is completely retractable below the top surface of the truck bed and adjustable in height to various positions above the truck bed. It can also be completely removed from the truck in minutes and stored, for example, hung on a wall.

The rack of the cargo securing system hereof comprises modular components that can be purchased and used independently of one another. The cargo securing system is also extendible and expandable into various configurations depending upon the type of load to be carried. For example, it permits securement of cargo to the surface of the truck bed, including between to the wheel wells. With the rack extended in height, additional cargo can be placed on the extended rack and/or below the rack in the truck bed. Upon extension in a horizontal direction, for example, over the cab of the truck, or rearwardly beyond the rear bumper of the truck, additional cargo carrying capability is provided. Multiple different loads can be secured to the rack at the same time. The rack is versatile in its orientation and can be readily set up in different orientations or multiply different positions in accordance with the nature of the cargo to be carried. The rack may also be securely stored within the bed when not in use and protects the sides of the truck bed and serves as a cab protector when in use or in the stored position.

In accordance with a preferred embodiment of the present invention, there is provided a truck cab and bed protector rack for a truck comprising a pair of generally upright elongated supports for securement to the truck adjacent opposite sides thereof and adjacent the truck cab, each support including an elongated upper section and an elongated lower section, each section comprising a box beam having an elongated flange projecting rearwardly from the box beam and an elongated flange projecting in a lateral direction from the box beam, each support including a member receivable within the upper and lower sections to secure the sections to one another with the upper section superposed over the lower section and the rearward and laterally directed flanges of the upper and lower sections in respective vertical alignment with one another at least one cross beam extending laterally between the supports and having opposite ends adjacent the laterally projecting flanges, and means cooperable with the flanges and the cross beam for securing the one cross beam to the laterally projecting flanges of the supports.

In another preferred embodiment of the present invention, there is provided a rack for location adjacent the tailgate of a truck comprising a pair of elongated upright supports for securement to the truck adjacent opposite to sides thereof, each support having first and second sections, each first section having elongated side walls and an end wall between the side walls, and a first pair of flanges projecting forwardly of the end wall remote from the side walls, a second pair of flanges projecting laterally from one of the side walls, each second section including a box beam having a first pair of elongated flanges, respectively, spaced from one another and projecting in a forward direction for reception between the side walls of the first section, the box beam of the second section also having at least one elongated flange projecting in a lateral direction generally perpendicular to the forward direction, means for releasably securing the first and second sections to one another with the first flanges of the second section received between the side walls of the first section, means for securing the sections along opposite sides of the truck adjacent the tailgate, and a first cross beam extending laterally between one of the first and second sections and connected at its opposite ends between the laterally directed flanges thereof.

In a still further embodiment of the present invention, there is provided a cargo securing system for a truck having a truck bed comprising a front frame including a pair of generally upstanding elongated supports for securement to the truck adjacent its opposite sides and a front portion of the truck bed, a rear frame including a pair of generally upstanding elongated supports for securement to the truck adjacent its opposite sides and a rear portion of the truck bed, a pair of side rails each comprised of an elongated support and an extension member longitudinally adjustable relative to one another to form side rails of selected adjustable lengths, means for releasably securing the side rails to said front and rear supports along opposite sides of the truck including, for each side rail, a releasable connection between the extension member and one of the front and rear supports along one side of the truck and between the side rail elongated support and another of the front and rear supports along the one side.

In another preferred embodiment of the present invention, there is provided a cargo securing system for a truck bed comprising a pair of generally upright elongated front supports for securement to the truck adjacent opposite sides thereof and adjacent the front of the truck bed, each front support including an elongated upper section and an elongated lower section, at least the upper section comprising a box beam having a pair of elongated flanges projecting rearwardly from the box beam, each front support including a member receivable within the upper and lower sections to secure the sections to one another with the upper section superposed over the lower section, a pair of elongated upright rear supports for securement to the truck bed adjacent opposite sides thereof and adjacent the rear of the truck bed, each rear support including first and second sections, each first section of the rear supports having elongated side walls and an end wall between the side walls, each second section of the rear supports including a box beam having a first pair of elongated flanges, respectively, spaced from one another and projecting in a forward direction, means for releasably securing each of the first and second sections of each rear support to one another, including a second member receivable within the first and second sections to secure the first and second sections of each rear support to one another with the second section superposed over the first section, means for securing the supports along opposite sides of the truck, an elongated element extending longitudinally between the upper and the second sections along each of the opposite sides of the truck and receivable at its opposite ends between the rearwardly and forwardly directed flanges of the upper and second sections, respectively, and means for releasably securing the elongated elements at each of the opposite ends thereof to the upper and second sections, respectively.

In a further preferred embodiment according to the present invention, there is provided a cargo securing system for a truck having a truck bed and to an upright support at each corner of the truck bed adjacent front and rear portions thereof, a side rail for extending between the front and rear supports along each of the opposite sides of the truck bed, each side rail comprising an elongated beam and an elongated extension element slidable along the elongated beam such that the length of each side rail is adjustable. The elongated beam has a pair of flanges projecting laterally inwardly of the truck and toward its opposite side and means for releasably coupling the elongated beam and extension of each rail in selected longitudinal positions relative to one another to provide side rails of selected adjusted lengths. Means are provided carried by each of the elongated beam and the extension element for securing the elongated beam and the extension element at opposite ends of each side rail to the front and rear corner supports, respectively.

In a further preferred embodiment according to the present invention, there is provided a cargo securing system for a truck having a truck bed, comprising a front frame including a pair of generally upstanding supports for securement to the truck adjacent its opposite sides and at a front portion of the truck bed, a rear frame including a pair of generally upstanding supports for securement to the truck adjacent its opposite sides and at a rear portion of the truck bed, a pair of side rails each comprised of an elongated support and an extension element longitudinally adjustable relative to one another such that the side rails are adjustable in length and means connecting each side rail at one end thereof to one of the front or rear pairs of supports whereby the rails extend therefrom.

Accordingly, it is a primary object of the present invention to provide a novel and improved cargo securing system for a truck bed and which system is adjustable in height, length and orientation for carrying a wide variety of cargoes.

BRIEF DESCRIPTION OF THE DRAWINGS

FIG. 3 is a fragmentary side elevational view looking from the centerline of the truck to one side illustrating one of the two front corner supports forming part of the rack hereof and a portion of a side rail thereof;

FIG. 4 is a rear elevational view of the corner support illustrated in FIG. 3 taken about on line 4—4 in FIG. 3;

FIG. 5 is a perspective view of the front corner support illustrated in FIGS. 3 and 4;

FIG. 10 is a side elevational view of the rear corner of the rack taken along the centerline of the truck and illustrating a further orientation of the rear support;

FIG. 11 is a view similar to FIG. 10 illustrating the tailgate protector portion of the rack in a longitudinal position extending rearwardly of the truck;

FIG. 12 is a view similar to FIG. 11 illustrating a further orientation of the rack in a longitudinally extended position;

FIGS. 13 and 14 are side elevational views of the rack in stored and extended positions, respectively;

FIGS. 15–19 are views similar to FIG. 14 illustrating various positions and orientations of the components of the rack to form a rack configuration suitable for different cargo carrying situations;

FIG. 20 is a rear perspective view of the truck rack with its components arranged in various positions;

FIG. 24 is a side elevational view of the front and rear corner supports with reinforcing braces applied;

FIG. 25 is an enlarged side elevational view of the upper portion of the front corner support illustrated in FIG. 24.

DETAILED DESCRIPTION OF THE DRAWINGS

Figure 1A:
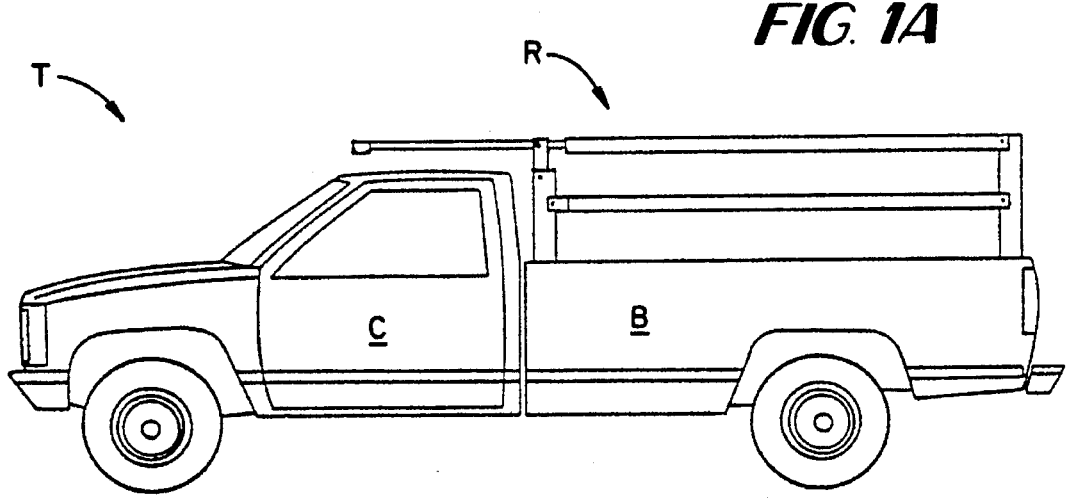
FIGS. 1A and 1B are side elevational views of a pickup truck with a cargo securing system according to the present invention including a truck rack illustrated in a vertically extended height-adjusted, as well as longitudinally extended, position and a stored position, respectively.
Figure 1B:
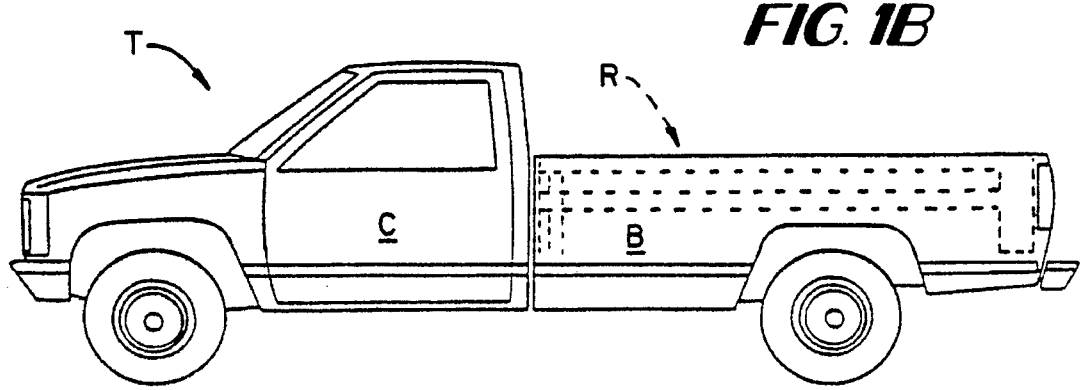

Referring now to FIGS. 1A and 1B, there is illustrated a truck, generally designated T, having a cab C and a truck bed B. A cargo securing system according to the present invention includes a rack, generally designated R, disposable in the truck bed B. Rack R is adjustable in height and longitudinal extent and between elevated and stored positions illustrated in FIGS. 1A and 1B, respectively. The components of rack R are adjustable into multiple other positions, not shown in these two drawing figures, but which will become apparent from the ensuing description to form a highly versatile cargo securing system.

Figure 2:
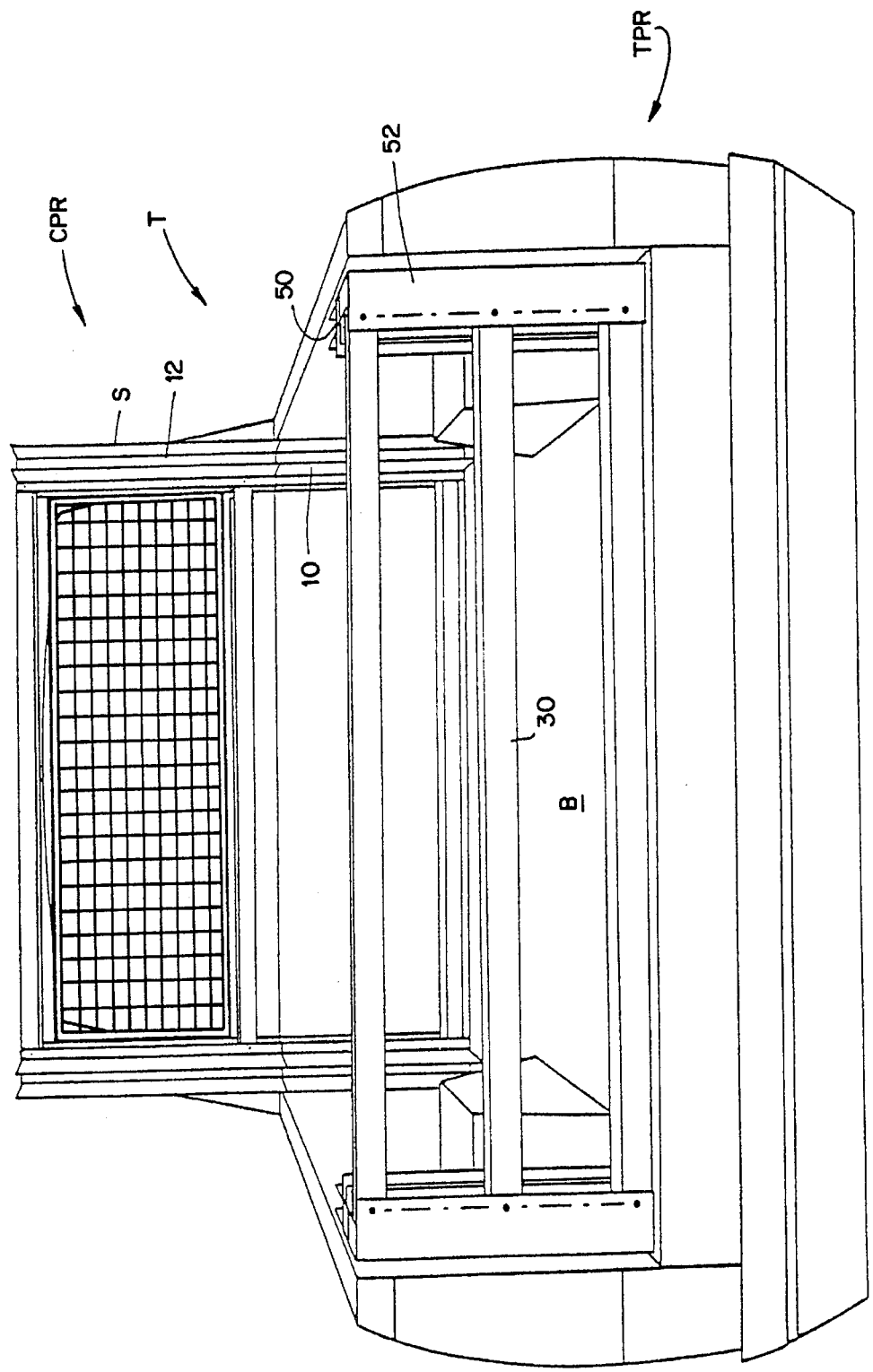
FIG. 2 is a rear perspective view of the truck rack mounted in the bed of a truck.
Figure 3A:
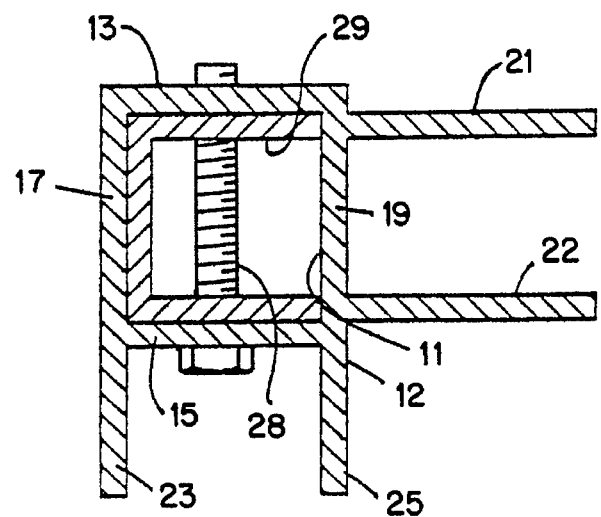
FIGS. 3A and 3B are cross-sectional views thereof on an enlarged scale taken generally about on line 3A—3A and 3B—3B in FIG. 3.

Referring now to FIG. 2, there is illustrated portions of the rack R hereof, namely a truck cab and bed protector rack, designated CPR, and a tailgate protector rack TPR. Referring to the truck cab protector rack CPR, it to comprises a pair of laterally spaced, vertically extending upright supports S, each consisting of upper and lower sections 10 and 12, respectively, disposed at the forward corners of the bed. As will be clear, the upper and lower supports 10 and 12 afford multiple different adjustments for supporting variously configured loads and for forming various configurations of the rack. The upper and lower sections are similar in cross-section to one another and, with reference to FIGS. 3–5, each essentially comprises a box beam 11 having laterally spaced side walls 13 and 15 and forward and rear walls 17 and 19, respectively. A pair of rearwardly extending flanges 21, 22 project from rear wall 19 and which flanges 21, 22 are inset from the side walls 13 and 15. A pair of laterally extending flanges 23 and 25, respectively, project laterally inwardly from box beam 11 in alignment with the front and rear walls 17 and 19, respectively. The lower section 10, in addition, has a pair of forwardly extending flanges 18a and 18b (FIG. 3B) in alignment with the laterally spaced side walls 15 and 13, respectively, for securement to a mounting plate, described below.

Figure 3B:
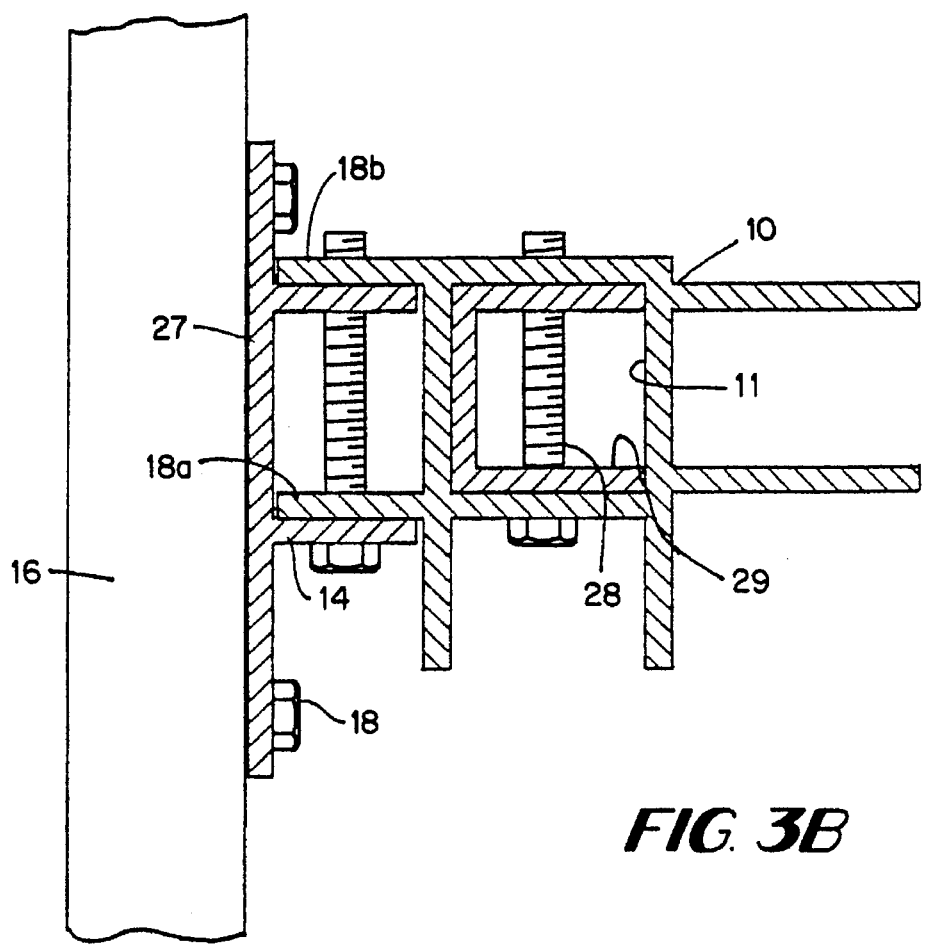
Figure 8:
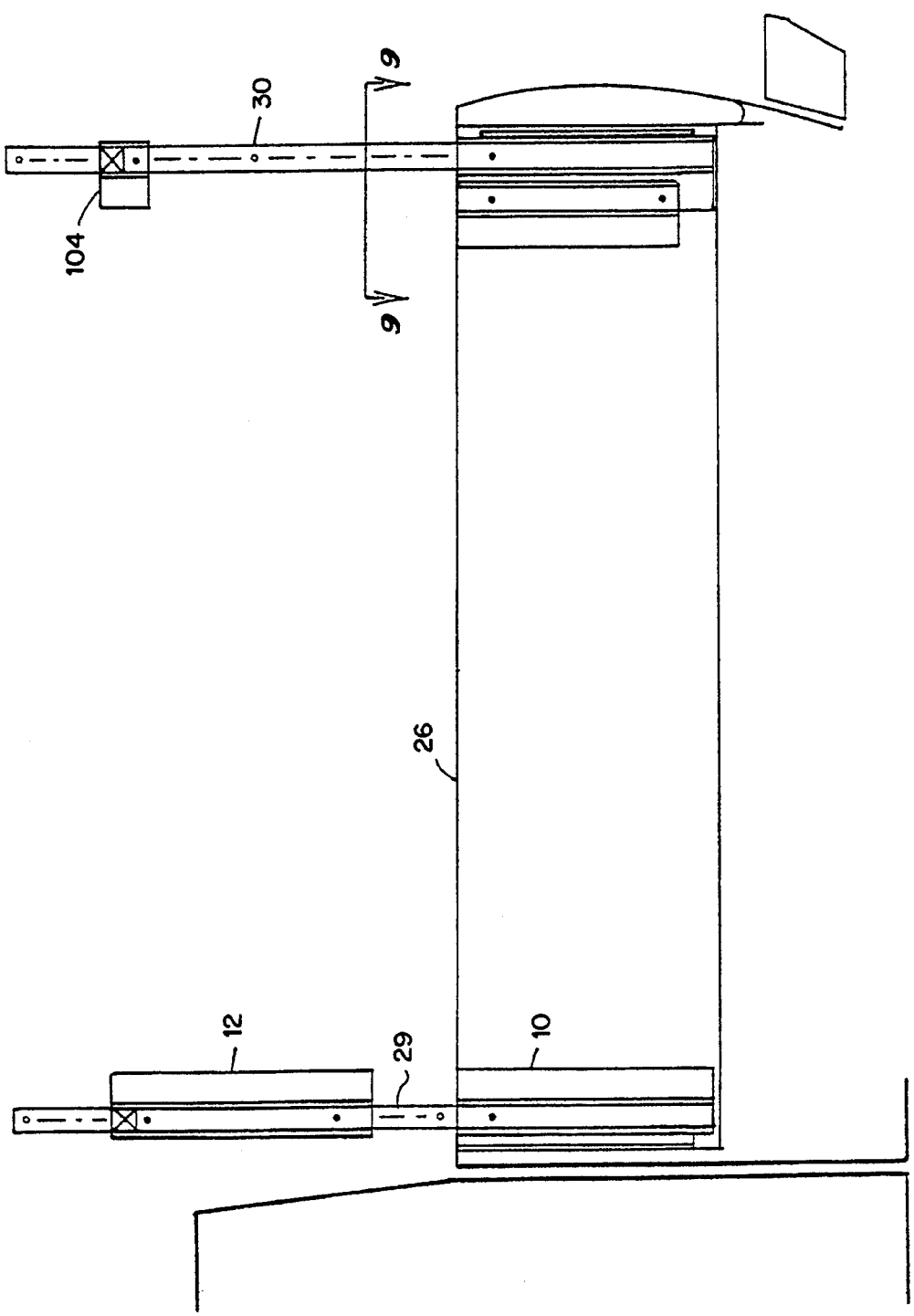
FIG. 8 is a cross-sectional view taken along the centerline of the truck illustrating the front and rear supports vertically extended.

As indicated by the dashed lines in FIG. 5, the front of the truck bed, i.e., the back of the truck cab, is generally indicated at 16, while the side of the truck bed is indicated at 26. As illustrated in FIGS. 3B and 5, a plate 27 having rearwardly projecting flanges 14 is secured by screws 18 to the front 16 of the truck bed 26 at each front corner. The flanges 14 have vertically spaced and laterally aligned apertures for receiving pins as described hereinafter. The flanges 18a and 18b may lie along the flanges 14 of the mounting plate 27 and may be pinned to flanges 14 by pins, as illustrated, whereby the lower section 10 can be secured to the truck at selected vertical positions along the mounting plate. It will be understood that this mounting arrangement is representational only and that other and different types of mounting means can be used, such as other types of brackets or plates for mounting the front corner supports to the sides or ends or bottom of the truck bed. To secure the upper and lower supports 10 and 12 to one another, a member 29 of box tube, channel, or other appropriate configuration but preferably channel-shaped, and approximately equal in length to the length of supports 10 and 12, is telescopically receivable within each box beam section 11 of the lower and upper sections 10 and 12, respectively, and spans the joint there between. A plurality of longitudinally spaced apertures 31 are provided along and through the side walls of the box beam sections 10 and 12 and also member 29. By disposing member 29 telescopically within the lower section 10 and pinning it in place by a pin 28 passed through registering apertures of the section 10 and member 29, the upper section 12 may be telescopically disposed over the portion of member 29 projecting above lower section 10. By passing another pin 28 through registering apertures of the member 29 and upper section 12, the upper and lower sections 10 and 12 are secured to one another. The height of the support 12 above support 10 can also be adjusted by selectively positioning member 29 and the upper support 12 above the lower support 10 for example as illustrated in FIG. 8. Additionally, the lower support 10 can be adjusted vertically relative to the mounting plate 27 to extend above the sides of the truck and may be pinned in that selected adjusted vertical position.

With the flanges 23 and 25 projecting laterally, and each being provided with a plurality of apertures 36 at vertically spaced positions therealong and aligned with one another, one or more crossbars 30 (FIG. 5) may be disposed between flanges 23 and 25 at selected elevations therealong. The crossbars 30 are preferably channels but may be beams or tubes or of other cross-sectional configurations having aligned apertures through opposite ends thereof. Crossbars 30 are secured by pins received in apertures 36 of the upper and/or lower sections and the apertures of the ends of the crossbars at selected adjusted vertical positions along the cab protector rack CPR. The crossbars are preferably formed of aluminum extrusions, similarly as are all other elements of the present system except as otherwise noted. By locating one or more cross beams 30 between the front corner supports 10 and 12, the crossbars 30 protect the cab of the truck and the front of the truck bed from cargo carried within the truck bed.

It is desirable to provide a truck cab protector that does not extend above the top of the truck cab 40 so that the user can drive through small openings, such as garage door openings, or under low clearance areas without requiring removal or retraction of the cab protector. Concurrently, it is also desirable to have the capacity to extend or adjust the vertical height of the cab protector CPR for storing cargo on top of the protector (with possible extension over the truck cab), as well as below it in the bed. To accomplish this vertical adjustment, there is provided an extension 42 (FIG. 5) having a cross-sectional shape corresponding to the cross-sectional shape of the upper support 12, respectively, except extension 42 does not include flanges corresponding to flanges 21, 22 of the support 12. Extension 42 has apertures along flanges 23a, 25a and side walls 13a, 15a. To secure the extension 42 on top of upper support 10, a second member 29 is telescopically received in the upper end of upper support 12 and pinned such that a portion of the member projects upwardly therefrom. The extension 42 may then be telescopically disposed over the exposed upper end of the member and pinned at adjustable longitudinal positions along the member. For reasons discussed hereinafter, one end, e.g., the upper end of the extension 42 has its front and rear walls 17a and 19a, respectively, (FIGS. 4 and 5) inset from its upper end a distance corresponding to the width of the crossbars 30 and a box beam tube 116 described below. Additional vertical adjustment may be provided by pinning a vertically extending member, i such as channel 29 or crossbar 30 within the open upper end of the extension 42 or upper support 12. Thus, a channel 29 (FIG. 6) may be inserted into the support 12 or extension 42 and pinned by inserting a pin through the aligned registering apertures. Vertically projecting channels 29 thus afford stops is for cargo resting on top of crossbars 30 as well as points of securement for the cargo. It will be appreciated from the ensuing description that the supports, extensions, members and crossbars used above the lower support 10 can be mounted in a stored position below the upper edge of the sides of the truck bed, which enables placement of a truck bed cover, truck cap or camper enclosure on the truck bed when the truck rack hereof is in a stored position.

Figure 9:
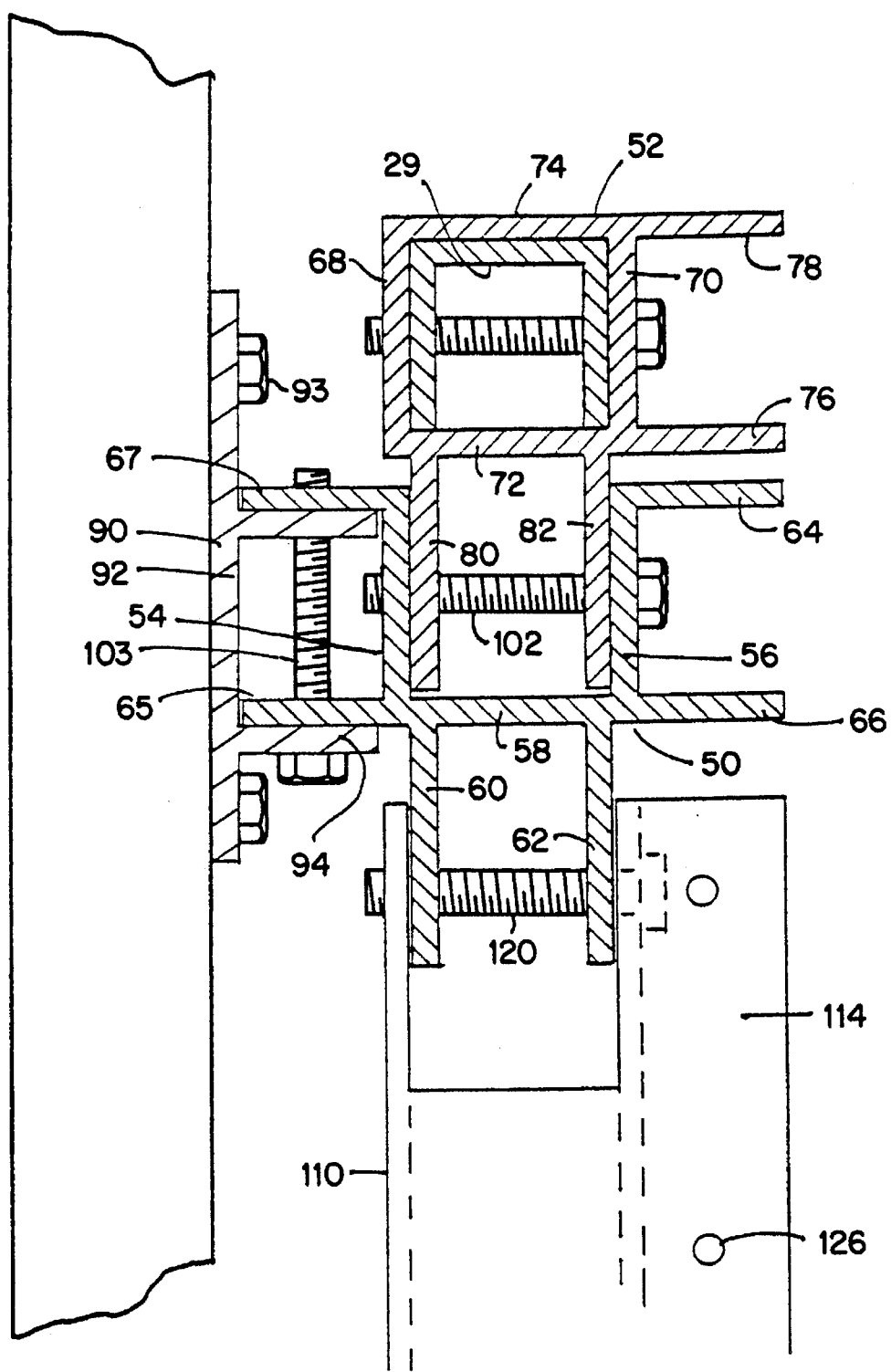
FIG. 9 is a cross-sectional view thereof on an enlarged scale taken generally about on line 9—9 in FIG. 8.

With reference to FIGS. 2, 6, 9 and 12, the rear tailgate protector rack TPR is illustrated using modular components shaped similarly as the components for the cab protector rack CPR. Particularly, the tailgate protector rack TPR includes, at each rear corner of the bed, lower and upper upright supports 50 and 52, respectively, extruded preferably of aluminum, the lower support 50 being secured to the side of the truck. Depending upon the desired configuration of the truck rack, each upper support 52 may be disposed in vertical alignment above lower support 50 (FIGS. 7 and 14) or in a lower position rearwardly of support 50 (FIGS. 9, 10 and 13) or in positions intermediate those positions. Lower support 50 includes a U-shaped channel having side walls 54 and 56 and a lateral wall 58 (FIG. 9). A pair of laterally spaced flanges 60 and 62 project forwardly and are inset from alignment with side wall 54 and 56, respectively. A pair of longitudinally spaced flanges 64 and 66 extend laterally inwardly from inner side walls 56. A pair of longitudinally spaced flanges 65 and 67 extend laterally outwardly from outer side walls 54. Apertures are disposed at longitudinal spaced positions along flanges 60, 62, 64, 66, 65, 67, as well as walls 54 and 56.

Upper support 52 has a cross-section identical in cross-sectional shape to the opposite front corner support 12. That is, upper rear support 52 is generally in the shape of a box beam, with side walls 68, 70, front and rear walls 72 and 74, respectively (FIG. 9). Flanges 76 and 78 project laterally from and are in alignment with the front and rear walls 72 and 74, respectively, while flanges 80 and 82 project forwardly from front wall 72, flanges 80 and 82 being inset from the side walls 68 and 70, respectively, of the box beam cross section of support 52. The flanges 76, 78, 80, 82 and walls 68, 70 have vertically spaced apertures therealong. It will be appreciated that cross beams, identical to the cross beams 30, previously described, may extend laterally between the rear corner supports at selected vertical positions therealong with their ends disposed between the flanges 76 and 78 or 64 and 66. With apertures at the ends of the cross beams, pins are used to secure the upright supports and the box beams to one another. As illustrated in FIG. 9, the flanges 80 and 82 of upper support 52 are spaced from one another and inset from side walls 68 and 70 for reception between side walls 54 and 56, of lower support 50, it being appreciated that the cross-sections of supports 50 and 52 are similar except that lower support 50 does not have a rear wall similar to wall 74 of upper support 52 and upper support 52 does not have laterally outwardly directed flanges similar to flanges 65 and 67 of the lower support 50.

Figure 6:
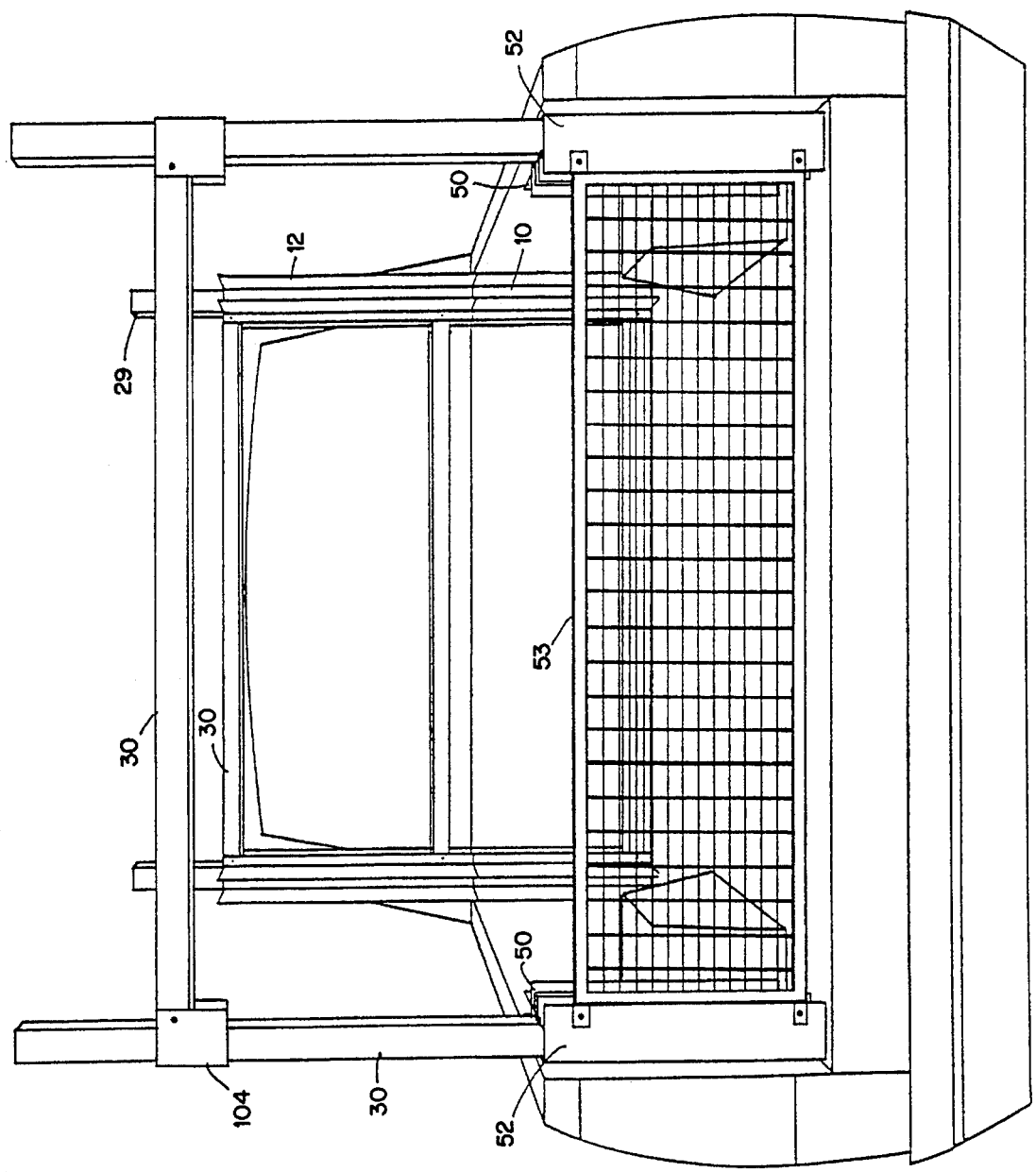
FIG. 6 is a rear perspective view looking from the rear end of the truck illustrating the front and rear corner supports of the cargo securing system hereof.

To secure the upright supports 50 and 52 to the truck bed, a rear mounting bracket 90 is provided and best illustrated in FIG. 9. The bracket 90 includes a flat plate 92 having spaced, inwardly projecting flanges 94. Flanges 94 have vertically spaced apertures therealong for receiving pins to secure the lower section 50 to the bracket 90 when the flanges 65, 67 and apertures thereof are aligned alongside flanges 94 and its apertures, respectively. Bracket 90 may be secured to the side of the truck by bolts 93. As in the mounting bracket for the cab protector, other and different types of brackets may be used to support the corner supports at the rear of the truck bed. As will be appreciated, multiple cross beams 30 can be disposed between the rear corner supports with their ends between flanges 76 and 78 and flanges 64 and 66 when the supports 50 and 52 are in vertical alignment (FIGS. 10 and 14), as described below, and secured by pins through registering apertures of those flanges. Also, as illustrated in FIG. 6, a tailgate screen 53 can be secured between the supports 52 by pins similar to those used throughout the cargo securing system thereof.

Figure 7:
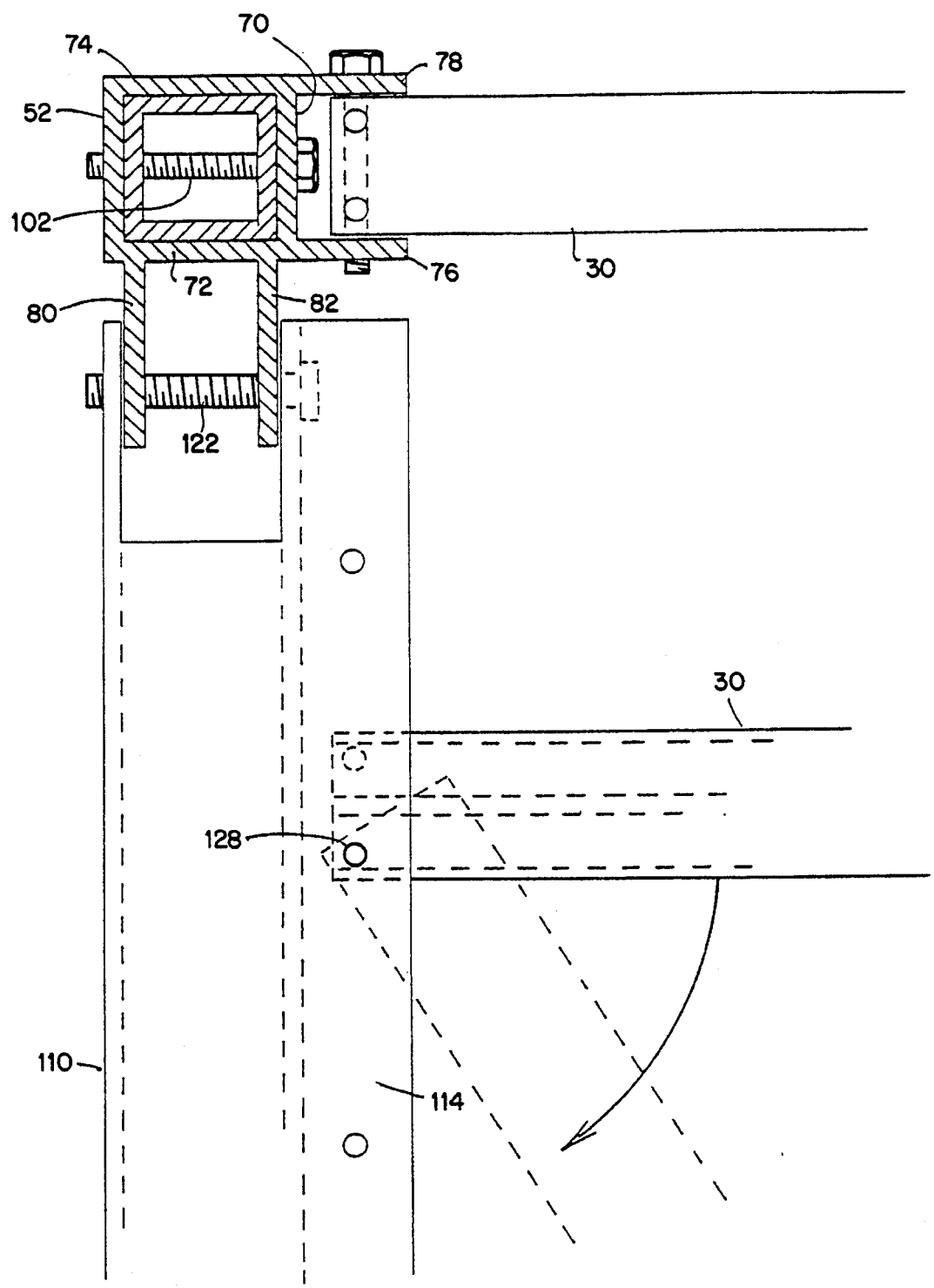
FIG. 7 is a fragmentary longitudinal cross-sectional view on an enlarged scale illustrating a rear corner support of the truck rack adjacent the truck tailgate and portions of a side rail and cross bars and taken generally about on line 7—7 in FIG. 16.

The tailgate protector TPR can be converted into an adjustable rack by inserting members 29 vertically and telescopically into the open upper ends of the supports 50. Pins 102 may be used to secure the vertically disposed members 29 in the lower corner supports 50 with portions of the members 29 projecting vertically above supports 50. Similarly as with the front supports, each upper support 52 is telescopically receivable over a vertically extending member 29 and in vertical alignment with lower support 50. One or more pins 102 are used to secure the upper support 52 to the vertically projecting member 29 as illustrated in FIG. 7. Consequently, additional cross beams 30 may be utilized as in FIG. 7 to comprise the top of the vertically extended rack with the cross beams 30 extending between upper supports 52 at the opposite rear corners of the rack. Note that the cross beams 30 for the tailgate protector may be stored in the cab protector rack or the tailgate protector rack TPR by inserting the cross beams 30 between the flanges 23, 25, or 76, 78 and stacking them one on top of the other within the support (FIG. 3) 10 or 50, respectively. Consequently, the rear corner supports may remain in place, either vertically superposed or with supports 52 longitudinally behind supports 50 (FIGS. 9, 10) while the cross beams 30 are stored, leaving the truck's tailgate area open when the tailgate is open. Note also that the upper and lower rear corner supports are located rearwardly of the rear wheel wells, as illustrated in FIG. 2, and occupy a space corresponding to less than the width of the rear wheel wells, thus not reducing or interfering with the storage space in the bed between the wheel wells.

Referring now to FIGS. 9 and 10, it will be appreciated that the lower corner rear supports 50 are secured to the mounting bracket 92 by pins 103 to received through aligned and registering apertures in the flanges 65, 67 and 94. Upper corner rear supports 52 are secured behind and to the lower supports 50 by pins 102 (FIG. 9) passing through apertures in registering flanges 80, 82 and side walls 54, 56. By removing all but the lowermost pins 102, the upper rear supports 52 can be pivoted into a horizontal position, as illustrated in FIG. 11. The supports 52 may therefore rest on the now-open tailgate TG, which is supported horizontally by its own collapsible brace, not shown. Note that crossbars 30 can be inserted into the box beam portions of the now horizontally disposed supports 52 and pinned such that cross beams 30 extend longitudinally rearwardly of supports 52 in selected longitudinally adjusted positions. Additionally, as illustrated in FIGS. 10 and 11, extensions 104 having cross-sections identical to the cross-section of support 52, but shorter in length, may be secured by pins to the ends of longitudinally extending cross beams 30 or adjusted longitudinally along cross beams 30. Each extension 104 thus has a box beam cross-section with inset flanges, one of which is illustrated at 82a and flanges 76a, 78a. In this manner, a cross beam 30 may extend transversely between extensions 104 with its opposite ends pinned between flanges 76a, 78a as illustrated. It will be appreciated by this construction that the rear support rack has been extended horizontally beyond the rear end of the truck and its tailgate to secure and support long cargo.

Referring now to FIG. 12, the supports 52 can be extended horizontally rearwardly from the truck but remain in a their vertical positions so that longer cargo or more cargo can be hauled at one time using the tailgate as an extension of the base of the truck bed. By removing all of pins 102 securing the upper and lower supports 52 and 50, respectively, to one another, the upper supports 52 can be detached from the lower supports 50. A C-shaped or upwardly opening channel-shaped saddle 106 has a depending square stub channel 108 which is telescopically disposed in the open upper end of each lower support 50. Particularly, the stub channel 108 is disposed to between the walls 54 and 56 of the lower support 50 and pinned. A box beam tube or channel 116 forming part of a side rail discussed hereinafter can be disposed in the saddle 106 and pinned by a pin 110. The distal end of the box beam tube 116 may carry an extension similar to the extension 42 illustrated in FIG. 5. Thus, the distal end of the tube 116 can be inserted into the box beam opening of an extension 42 and pinned. A channel member 29 may be telescopically disposed in the upper support 52 and pinned therein to project between the side walls 13a, 15a of extension 42. By pinning the box beam tube 116 to the extension 42 and using member 29 to interconnect extension 42 and upper support 52, the upper support 52 may be structurally and dependently supported from the distal end of the longitudinally extending box beam tube 116. Cross beams 30 may be pinned at opposite ends between the flanges 76 and 78 of upper support 52 at selected elevations as illustrated.

In FIGS. 15–16, there is illustrated a complete retractable rack forming a cargo securing system according to the present invention. As illustrated, one or more side rails 110, 112 may be employed on each side of the truck to enclose the sides of the rack, e.g., when extended into its height-adjusted position. As illustrated in FIG. 15 (see also FIGS. 4, 5), the side rails 110, 112 are identical in cross-section to one another, each comprising an elongated support, preferably a box beam, having upper and lower laterally inwardly directed flanges 114 and 115. Box beam tubes 116, are telescopically received and stored within the box beam portions of side rails 110 and 112, respectively. Other cross-sectional shapes may be used, such as channels. When extended, the box beam tubes permit longitudinal extension of the side rails 110, 112, as described hereinafter. Tubes 116 have a plurality of longitudinally spaced apertures 118 (FIG. 3) along their side walls. Thus, pins 120 may be used to secure extension tubes 116 to the side rails 110, 112, respectively, at longitudinally adjusted positions while pins 122 (FIG. 5) are employed to secure the tubes 116 to the upright extensions 42 between side walls 13a and 15a thereof. Note that the upper ends of supports 10 and 12 can be formed similarly as extensions 42, i.e., having front and rear sides recessed to receive the tubes 116, whereby the side rails may be attached to the upper ends of either extensions 42 (FIG. 5) or upper or lower supports 10, 12. The side rails 110, 112 may be secured to the upright supports 10, 12 at any vertical position therealong by retracting and pinning the retracted longitudinal tubes 116 and side rails 110, 112 to one another, locating the ends of tubes 116 telescopically endwise within extensions 42, e.g., as illustrated at the end of tube 116 in FIG. 5, pinning extensions 42 to the ends of tubes 116, locating the side walls 13a and 15a to straddle flanges 21 and 22 and pinning the side walls 13a, 15a of the extensions 42 to the flanges 21 and 22.

The opposite ends of the side rails 110, 112 are secured to a rear support 50, 52 by pin connections 120 (FIG. 9) or 122 (FIG. 7). Note that the top and bottom wall portions of the rear ends of the side rails as well as extensions 42 are recessed a distance in excess of the length of flanges 60, 62 and 80, 82 to permit pivotal movement of the side rails about their pinned connections 120 with supports 50 and 52 or supports 10 and 12, as discussed hereinafter. The flanges on the supports 10, 12, 50 and 52 have a plurality of vertically spaced apertures such that the side rails 110, 112 can be located at selected vertically adjusted positions therealong. Note that the adjustment in length of the side rails by using the tubes 116 enables the rear ends of the rails to be connected at longitudinally different locations, compare FIGS. 7 and 9. It will be appreciated that crossbars 30 can be placed at selected adjusted positions along the side rails 110, 112 and pinned. Note that the laterally inwardly projecting flanges 114, 115 of each side rail 110, 112 may have a series of apertures 126 (FIG. 9). By placement of the apertures 126 spaced from the interior sides of rails 110, 112, the crossbars 30 can be pinned by pins 128 to the side rails in a manner enabling the crossbars to pivot as illustrated in FIG. 7. Thus, the crossbars 30 may be secured extending to laterally between the opposite side rails 110 or 112 and may be pivoted into a stored position within the flanges 114 and 115 of a side rail pinned at both ends for securement in a stored position. To minimize the number of apertures along the side rails, the crossbars 30 may have apertures at their ends spaced laterally from one another, thus enabling the crossbars to be located in additional longitudinal positions without increasing the number of apertures in the side rails. It will be appreciated that a plurality of the crossbars 30 can be disposed between the side rails 110, 112. Consequently, by vertically adjusting the securement at the ends of the side rails relative to the front and rear corner supports, one or more crossbars may be secured at adjustable heights and at a variety of longitudinal locations along the length of the rack. While two side rails on each side of the truck are illustrated, any number of side rails may be used.

Referring now to FIGS. 13 and 14, the cargo securing system hereof may not require side rails of the type described but can use lengths of standard lumber, e.g., 2×4's in lieu thereof. The flanges of the front and rear supports, i.e., flanges 21, 22, 60, 62, 80 and 82, are sized to permit insertion of a standard 2×4. Consequently, by drilling a hole in the opposite ends of a 2×4, the 2×4 designated 117 in FIGS. 13 and 14 may be pinned to the front and rear supports at selected elevations therealong. Also, various elements, such as the upper front support 12 may be secured at selected longitudinal positions along the length of the 2×4 spanning between the front and rear supports, e.g., for storage. Cross bars may be attached to components of the system secured at selected longitudinal positions along the 2×4's. For example, the front support 12 may be placed on its side with the flanges 21 and 22 straddling the 2×4. Holes may be preformed in each 2×4 at longitudinal locations therealong such that the upper support can be pinned at selected longitudinal positions along the 2×4. Therefore, cross bars 30 may be located along the 2×4's at various locations as needed. Note also that various ones of the extensions 42, 104 and the saddles 106 can be secured similarly to the 2×4 for storage purposes. It should be appreciated also that elements of the cargo securing system can be adjusted about the standard lumber, in effect making it a necessary structural part of the system when side rails 110 and 112 are not available.

In FIGS. 15 and 16, the upper and lower side rails 110 and 112 are employed with either the members 29 extended from the front and rear supports as illustrated in FIG. 15 or coupled to the front and rear supports per se, as illustrated in FIG. 16. Thus, in FIG. 15, the members 29 or cross beams 30 may be disposed in the lower front support 10 or in the upper rear supports 52, when in its stored lower position, to project upwardly therefrom end to end for pinned securement with the side rails. In FIG. 16, the upper front support 12 is superposed on the lower support 10, while the rear upper support 52 is at an adjusted elevation relative to the lower rear support 50. The upper and lower side rails 110 and 112, respectively, interconnect between the front and rear upper supports and the front and rear lower supports. In FIGS. 13 and 15, the screen 53 for the cab protector may be stored between the front wall 17, 23 of the lower support and the plate 27 when not in use. The screen 53 can be removed from its illustrated stored position and pinned to the supports at adjusted elevations therealong.

Referring now to FIGS. 17–26, there are illustrated many and various forms or configurations of the cargo securing system of the present invention and which forms and configurations should be considered as representative rather than limiting or exhaustive of the possible number of configurations. In FIG. 17, the front, upper and lower supports 12 and 10, respectively, are superposed, while the upper support 52 of the rear support is longitudinally extended rearwardly and located above support 50. In that configuration, the lower side rails 112 is turned 180° and the tube 116 of the lower side rail 112 is extended through and pinned to saddle 106. The distal end of tube 116 carries an extension 42, the flanges 80 and 82 of the upper support 52 being pinned between the side walls 13a and 15a of the extension 42. The upper rail 110 is pinned to the upper end of the upper corner support 52, the recessed end thereof straddling and being pinned to flanges 80, 81. Tube 116 extends from the forward end of side rail 110, and mounts an extension 42, as previously described, the side walls 13a and 15a of which straddle the flanges 21 and 22 of upper front support 12. A channel 29 or cross beam 30 may also depend from the extended upright support 52 mounting the extension 104 at its lower end. Cross beams 30 may be pinned between the flanges 76 and 78 of the upper support 52 and the flanges of extensions 104 pinned to the lower ends of depending member 29. Similarly cross beams 30 may be secured between the front upper support 12, as well as the corresponding flanges of the front and rear lower supports. Thus, in FIG. 17, cargo longer than the bed of the truck, can be suitably secured to the truck.

Referring now to FIG. 18, the system may also be employed to provide a stationary rack supported, in part, on the ground and, in part, by the truck. To accomplish this, the upper support 52 is removed from its stored position pinned to support 50. The box tube 116 of each side rail may be extended and pinned at its forward end to the lower support 50 between the side walls 54 and 56 thereof. The box tube 116, in turn, is pinned to the side rail 110 which, at its opposite end, is pinned to the flanges 80 and 82 of upper support 52 at its upper end. A channel member 29 or cross beam 30 may be extended vertically from the lower end of upper support 52 a predetermined distance for engagement with the ground and pinned to support 52. Suitable cross beams 30 may be disposed between the two side rails projecting from the rear of the truck to provide a work platform which is stationary and adjustable longitudinally in length, as well as vertically in height.

In FIG. 19, it will be appreciated that the rear upper support 52 can be disposed at different elevations along support 50 and pinned at a selected locations therealong. With the extension 42 secured to the upper support 12, as previously described, and the upper support 12 secured above the lower support 10 at the front end of the bed, the side rail may be pinned at its rear end to the flanges 80 and 82 of upper rear support 52. The tube 116 of the side rail 110 can likewise be pinned to the extension 42, providing a slope to the side rails while extending over the cab, for easier loading and unloading of certain types of cargo. As in prior embodiments, one or more cross beams 30 may be provided between the side rails at longitudinally spaced locations therealong.

In FIG. 20, there is illustrated a configuration of the cargo securing system wherein the cross beams 30 project upwardly from the rear upper supports 52 and side rails 110 extend between the upstanding cross beams 30 and the forward supports, as described previously. The C-saddles 106 can be pinned to transversely extending cross beams 30. In this instance, a saddle 106 is pinned to the rearmost cross beam 30, while an inverted saddle 106 is pinned to a cross beam 30 at the lower end of the front supports 10. A side rail 112 can be pinned at an angle between the depending tube of the C-saddle 106 and the upstanding tube of the forward C-saddle 106. Another side rail may be secured between the lowermost cross beams 30 as illustrated, or angled between them. FIG. 20 illustrates how the expanding side rails can be used to secure cargo to the floor of the truck bed, at almost any angle horizontally or vertically.

Figure 21:
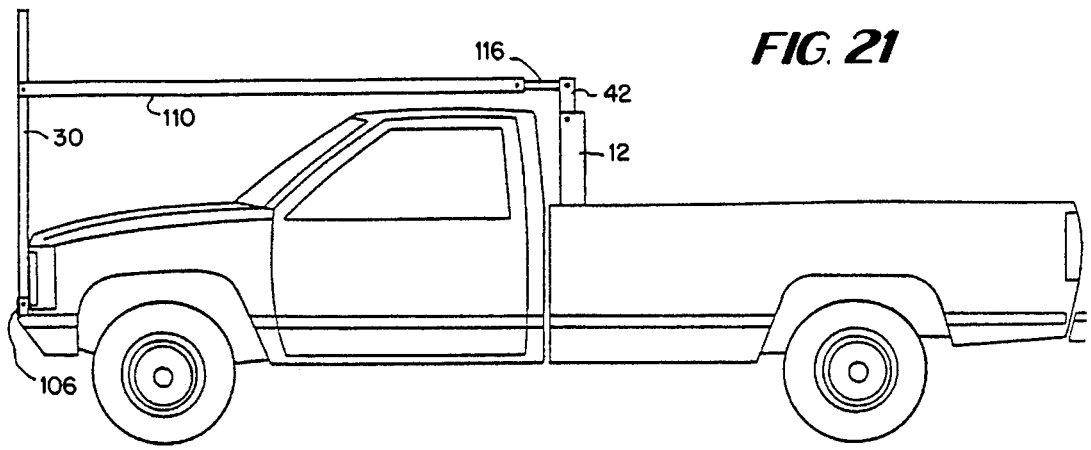
FIGS. 21–23 are side elevational views of the truck rack hereof with the components thereof in various configurations depending on the load to be carried.

In FIG. 21, there is illustrated an extension 42 on each of the upper forward supports 12 which receives between side walls 13a and 15a a tube 116 of a side rail 110 extending over the cab of the truck. The recessed end of the side rails 110 may be pinned to an upstanding cross beam 30 secured at its lower end in a C-saddle 106. The C-saddle may be bolted to the bumper of the cab or otherwise secured to the front end of the cab. A storage platform may be provided on top of the rails 110 with one or more cross bars on opposite sides of the truck to provide a storage area above the cab.

Figure 22:
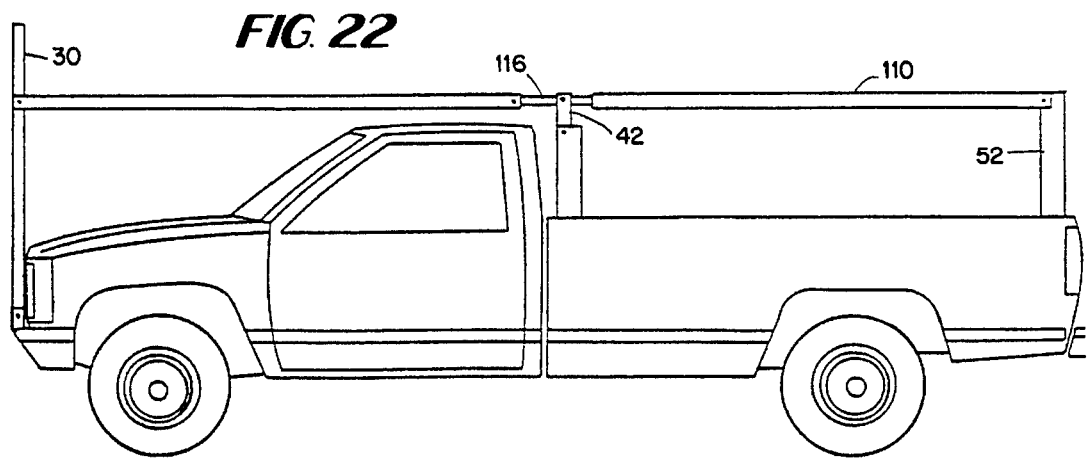

Referring to FIG. 22, a pair of side rails on each of the opposite sides of the truck may be disposed in line with one another, one side rail lying over the cab, while the other side rail lies over the bed. Each of the rails is at a corresponding elevated position. In this form, a single box tube 116 may be disposed in the near ends of the two side rails and pinned to the extension 42. The opposite ends of the side rails are pinned to upright cross beams 30 and the upper rear supports 52, respectively, in a manner previously described. Consequently, a level horizontal support is provided the full length of the truck. It will be appreciated that suitable cross beams 30 can be extended between the side rails at selected longitudinal positions therealong and at various elevations. It should be appreciated that the multiple side rails used in these illustrations can all be placed in a stored and use position below the top surface of the truck bed.

Figure 23:
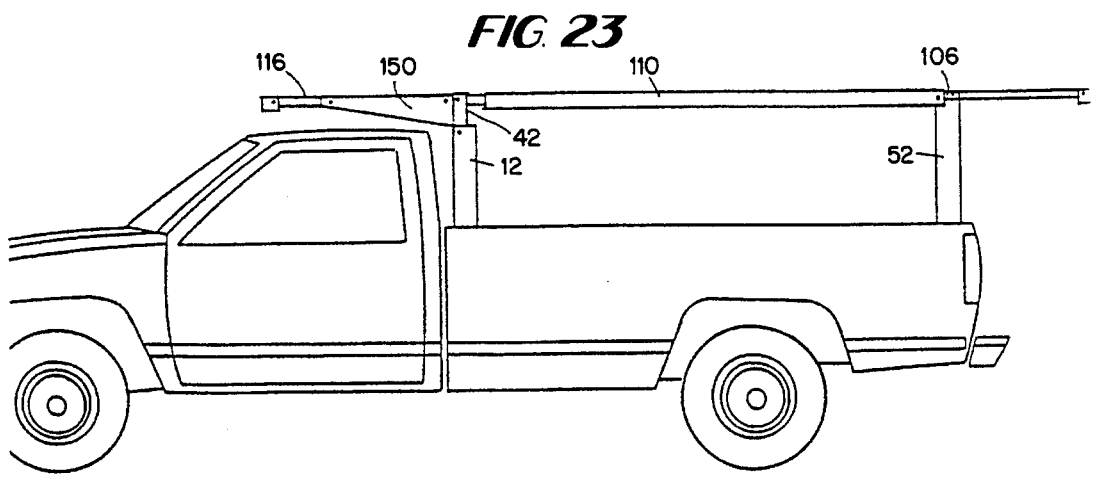

Referring to FIG. 23, the horizontal support or rack can be extended partially over the cab of the front of the truck as desired. In this form, the box tube 116 passes through the extension 42 on the upper supports 12. A suitable brace 150 may be provided and pinned to the box tube 116 of extension 42. As illustrated in FIG. 25, an elastomeric cushion 152 may be disposed between the rear end of the brace and the extension 42 so that the brace reinforces the cantilevered box tube 116. The side rail 110 is secured to the rear support 52 by extending a cross beam 30 from the end of the side rail and pinning it to a saddle 106, the stub channel of which is telescopically in and pinned to the support 52. The cross beam 30 extends rearwardly to selected lengths as desired.

In FIG. 24, bracing 150 is illustrated at the cantilevered portions of the box tubes over the cab and also projecting rearwardly from the bed. The bracing 150 over the cab is the same as illustrated in FIG. 23. The bracing 150 rearwardly of the bed similarly is pinned to the rearwardly projecting tube 116 and abuts the upper support 52. As in the prior embodiments, various cross beams 30 can be provided between the side rails to support a platform or to provide securing points for cargo to be secured.

Figure 26:
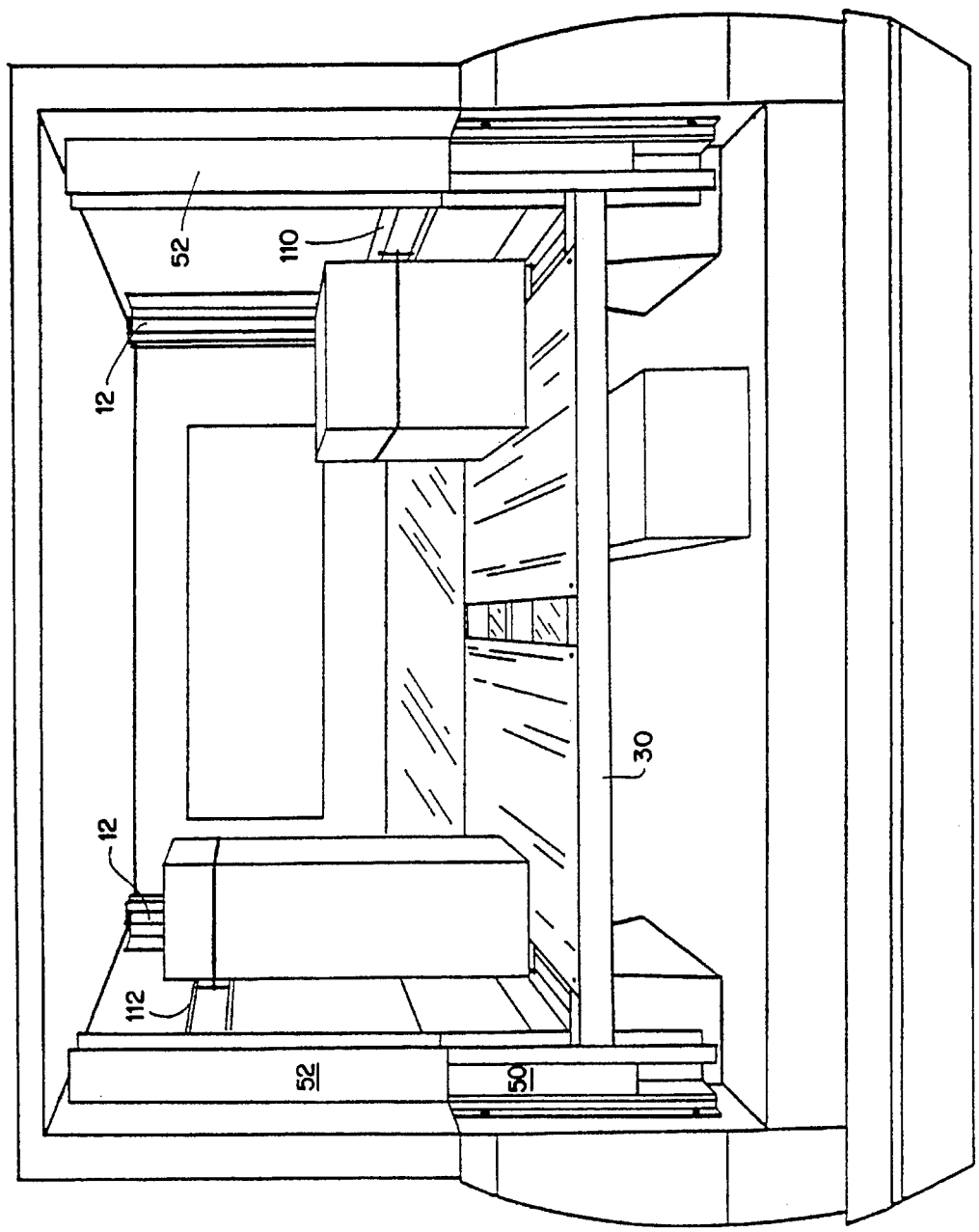
FIG. 26 is a perspective view of the rear of the truck with the components of the cargo securing system arranged to enable mounting of a truck canopy.

Referring now to FIG. 26, an additional configuration of a rack system according to the present invention for use in conjunction with a canopy or cap for the truck bed is illustrated. As illustrated, the upper supports 12 and 52 are in vertical alignment with the lower supports 10 and 50, as applicable, at the four corners of the truck bed. Cross beams 30 are provided at an elevation above the floor of the bed and between side rails at that elevation whereby sheet flooring can be disposed on the cross beams to provide a full floor. Consequently, there is provided a large storage area below the flooring and coextensive with the truck bed. Additionally, it will be appreciated that the upper supports, both front and rear, lie within the vertical confines of the interior sides of the bed. This permits a cap or canopy normally secured to the side walls of the truck bed to be disposed over the upper supports. Thus, the upper supports can be used as supports for the side rails and for cross beams at various elevations, as desired, and within the overlying canopy.

In all of the front and rear corner supports, extensions and side rails, the apertures for receiving the pins are preferably on three-inch centers, although it will be appreciated that differently dimensioned centers and centers non-uniformly spaced may be employed. Additionally, any type of pin may be employed. For example, pins having enlarged heads at one end and spring-biased retention rollers at the opposite ends may be used. Alternatively, to bolts with screw threads at their distal ends may be used with nuts or wing nuts. Further, it will be appreciated that the rack hereof may be secured to the truck without welding and without using special equipment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rack for a truck having a cab comprising:

a pair of generally upright elongated supports for securement to the truck adjacent opposite sides thereof and adjacent the truck cab, each support including an elongated upper section and an elongated lower section, each section comprising a box beam having an elongated flange projecting substantially continuously therealong and rearwardly from said box beam and an elongated flange projecting substantially continuously therealong and in a lateral direction from said box beam;

each said support including a member receivable within said upper and lower sections to secure said sections to one another with the upper section superposed over the lower section and the rearward and laterally directed flanges of the upper and lower sections in respective vertical alignment with one another;

at least one cross beam extending laterally between said supports and having opposite ends adjacent said laterally projecting flanges; and means cooperable with said laterally projecting flanges and said cross beam for securing said one cross beam to said laterally projecting flanges of said supports at selected adjustable heights therealong.

2. A rack according to claim 1 including a mounting bracket for each support for securing said lower section to the truck, and means coupling between said lower sections and said mounting bracket for securing said lower section to said bracket at selected vertical adjustable positions along said brackets.

3. A truck rack according to claim 1 including a pair of elongated upright rear supports for securement to a bed of the truck adjacent opposite sides and the rear of the truck bed, each rear support including upper and lower sections, means for adjustably securing said upper and lower sections of said rear supports to one another along each of the opposite sides of the truck bed such that said upper section is adjustable in height relative to said lower section, each said upper and lower sections including at least one flange projecting substantially continuously therealong and forwardly therefrom and a pair of side rails, and means for connecting each side rail to said rearwardly and forwardly projecting flanges of said front and rear supports along opposite sides of the truck bed.

4. A truck rack according to claim 3 wherein said side rails each comprise an elongated support and an extension member longitudinally adjustable relative to one another to form side rails of selected adjustable lengths.

5. A truck rack according to claim 3 wherein each of said upper and lower sections of said rear supports includes an elongated flange projecting substantially continuously therealong and laterally thereof, at least another cross beam extending laterally between said supports and having opposite ends adjacent said laterally projecting flanges of said rear supports, means cooperable with said laterally projecting flanges of said rear supports and said another cross beam for securing said another cross beam to said laterally projecting flanges of said rear supports at selected adjustable heights therealong.

6. A rack for location adjacent the tailgate of a truck comprising:

a pair of elongated upright supports for securement to the truck adjacent opposite sides thereof, each said support having first and second sections, each said first section having elongated side walls and an end wall between said side walls, and a first pair of flanges projecting forwardly of said end wall remote from said side walls, a second pair of flanges projecting laterally from one of said side walls, each said second section including a box beam having a first pair of elongated flanges, respectively, spaced from one another and projecting in a forward direction for reception between said side walls of said first section, the box beam of said second section also having at least one elongated flange projecting in a lateral direction generally perpendicular to said forward direction, means for releasably securing said first and second sections to one another with said first flanges of said second section received between said side walls of said first section;

means for securing said sections along opposite sides of the truck adjacent the tailgate; and a first cross beam extending laterally between one of said first and second sections and connected at its opposite ends between the laterally directed flanges thereof.

7. A rack according to claim 6 including a second cross beam extending laterally between said one of said sections adjacent opposite sides of the truck and between the laterally directed pairs of flanges thereof, first and second means releasably securing said first and second cross beams at spaced elevations relative to one another along said one section, said first and second beams being dimensioned relative to the box beams forming said second section and relative to side walls of said first section such that, upon removal of said first and second cross beams from between said supports, the first and second cross beams are telescopically receivable within the respective box beams of said second sections or between the side walls of said first sections in selected adjusted positions therealong to extend above said second or first sections; and means for securing the first and second cross beams relative to said first or second sections, respectively, in said selected adjusted positions within the box beams of said second sections or between said side walls of said first section.

8. A rack according to claim 7 wherein said first section is secured to said truck, said second section being movable to a generally horizontal orientation projecting rearwardly from said first section, and means for releasably coupling said first section to the second section when the second section projects rearwardly.

9. A rack according to claim 8 including first and second cross beams respectively telescopically receivable in said box beams of said second section when in said horizontal orientation to project rearwardly therefrom, a pair of extensions comprised of box beams the telescopically receiving the distal ends of said first and second box beams respectively, means for securing said extensions and the box beams to one another, each said extension having a pair of flanges projecting laterally therefrom when the extensions are secured to the box beams, and a cross beam extending laterally between said extensions.

10. A rack according to claim 6 including a member telescopically slidable within one of said sections along each of the opposite sides of the truck to project above said one section, said second section being superposed over and telescopically receiving said member to form a vertical extension of said first section, and means cooperable between said first and second sections and said members for securing said members and said sections to one another.

11. A rack according to claim 10 wherein said first cross beam extends laterally between said second sections and has apertures through its opposite ends, said laterally directed flange of each said second section having a plurality of apertures at longitudinal spaced positions therealong, and pins for reception in aligned apertures of said cross beam ends and said flanges of the second section for securing the first cross beam to said rack.

12. A rack according to claim 6 wherein said first pair of flanges of said second section and said side walls of said first section have a plurality of apertures at longitudinally spaced positions therealong, said second section being movable relative to said first section into selected vertically adjusted positions relative to said first section such that said second section projects above said first section, and pins for reception in aligned apertures of said side walls of said first section and said pair of flanges of said second section for securing said second section in a vertically adjusted position above said first section.

13. A cargo securing system for a truck bed comprising:
a pair of generally upright elongated front supports for securement to the truck adjacent opposite sides thereof and adjacent the front of the truck bed, each front support including an elongated upper section and an elongated lower section, at least said upper section comprising a box beam having a pair of elongated flanges projecting rearwardly from and extending continuously along substantially the entire length of said box beam;

each said front support including a member receivable within said upper and lower sections to secure said sections to one another with the upper section superposed over the lower section;

a pair of elongated upright rear supports for securement to the truck bed adjacent opposite sides thereof and adjacent the rear of the truck bed;

each rear support including first and second sections;

each said first section of said rear supports having elongated side walls and an end wall between said side walls;

each said second section including a box beam having a first pair of elongated flanges, respectively, spaced from one another and projecting forwardly from and extending continuously along substantially the entire length of the box beam of said second section;

means for releasably securing each of said first and second sections to one another, including a second member receivable within said first and second sections to secure said first and second sections to one another with said second section superposed over said first section;

means for securing said supports along opposite sides of the truck;

an elongated element extending longitudinally between said upper and said second sections along each of the opposite sides of the truck and receivable at its opposite ends between the rearwardly and forwardly directed flanges of said upper and said second sections, respectively; and means for releasably securing said elongated elements and said upper and second sections at the opposite ends of said elements.

14. In a cargo securing system for a truck having a generally rectilinear truck bed and an upright support at each corner of the truck bed adjacent front and rear portions thereof, each support including elongated upper and lower sections and a member receivable within said upper and lower sections to secure said sections to one another with the upper section superposed over the lower section, a side rail for extending between the front and rear supports along each of the opposite sides of the truck bed, each said side rail comprising an elongated beam including first and second beam sections and an elongated extension element slidable relative to said beam sections such that the length of each said side rail is adjustable, said beam sections each having at least one flange projecting laterally inwardly of the truck toward its opposite side and extending substantially continuously along the entire length of said beam sections, means for releasably coupling said beam sections and extension of each said rail in selected longitudinal positions relative to one another to provide side rails of selected adjusted lengths, and means carried by each of said beam sections for securing said elongated beam sections at opposite ends of each side rail to the front and rear corner supports, respectively.

15. A cargo securing system according to claim 14 wherein said elongated beam sections each comprise a box beam and said extension element is telescopically received within said box beam sections, each said box beam section including a pair of flanges projecting laterally inwardly of said box beam sections and carrying a plurality of securing means for releasably securing cross beams to and between said side rails.

16. A truck cab and bed protector rack for a truck comprising:
a pair of generally upright elongated supports for securement to the truck adjacent opposite sides thereof and adjacent the truck cab, each support including an elongated upper section and an elongated lower section, each section comprising a box beam having a first pair of laterally spaced elongated flanges projecting rearwardly from said box beam and a second pair of longitudinally spaced elongated flanges projecting in a lateral direction from said box beam;

each said support including a member receivable within said upper and lower sections to secure said sections to one another with the upper section superposed over the lower section and the rearward and laterally directed flanges of the upper and lower sections in respective vertical alignment with one another;

at least one cross beam extending laterally between said supports and having opposite ends adjacent said laterally projecting flanges; and means cooperable with said flanges and said cross beam for securing said one cross beam to said laterally projecting flanges of said supports;

said members each comprising at least a three-sided beam telescopically receivable within the box beams of said upper and lower sections, said supports and said members having a plurality of apertures spaced therealong through opposite sides thereof, and pins receivable in registering apertures thereof for securing said upper and lower sections and said member of each support to one another.

17. A rack according to claim 16 wherein said second pair of flanges includes a plurality of apertures spaced from one another therealong, said one cross beam having an aperture at each opposite end, said securing means including a pair of pins for reception in a selected pair of apertures of the second pair of flanges of each support and said one cross beam, enabling said one cross beam to extend laterally between said supports at selected adjustable heights therealong.

18. A rack according to claim 16 including an extension for each support, each extension including a box beam having a pair of flanges projecting laterally from said extension box beam, means for removably securing each said extension to a distal end of an upper section to increase the height of the rack above the truck cab, said pair of flanges of said extension and said second pair of flanges of said sections corresponding in spacing and location about the respective box beams comprising said sections and said extensions.

19. A rack according to claim 18 wherein said means for securing each said extension and said upper section comprises at least a three-sided beam telescopically receivable within the box beams of the upper section and the extension, each said beam having a plurality of apertures therealong through opposite sides thereof and pins receivable in registering apertures thereof for securing said upper section, said member and said extension to one another.

20. A cargo securing system for a truck having a truck bed comprising:

a front frame including a pair of generally upstanding elongated supports for securement to the truck adjacent its opposite sides and a front portion of the truck bed;

a rear frame including a pair of generally upstanding elongated supports for securement to the truck adjacent its opposite sides and a rear portion of the truck bed;

a pair of side rails each comprised of an elongated support and an extension member longitudinally adjustable relative to one another to form side rails of selected adjustable lengths;

means for releasably securing said side rails to said front and rear supports along opposite sides of said truck including, for each side rail, a releasable connection between said extension member and one of said front and rear supports along one side of the truck and between said side rail elongated support and another of said front and rear supports along said one side;

each of said releasable connections including a pin and a plurality of apertures spaced from one another along said one of said front and rear supports to enable a pinned connection between the extension member and said one of said front and rear supports at one end of the truck bed and along another of said front and rear supports to enable a pinned connection between the elongated support and said another of said front and rear supports at the opposite end of the truck bed whereby, upon telescoping said side rail, the side rail may be angled from the horizontal for connection between the front and rear supports along said one side of said truck and extending over and beyond a vertical support.

21. A cargo securing system according to claim 20 wherein each of said front supports includes an elongated upper section and an elongated lower section, each section comprising a box beam having an elongated flange projecting substantially continuously therealong and rearwardly from said box beam and an elongated flange projecting substantially continuously therealong and in a lateral direction from said box beam, each said front support including a member receivable within said upper and lower sections to secure said sections to one another, with the upper section superposed over the lower section and the rearward and laterally directed flanges of the upper and lower sections in respective vertical alignment with one another, at least one cross beam extending laterally between said supports and having opposite ends adjacent said laterally projecting flanges, means cooperable between said laterally projecting flanges and said cross beams for securing said one cross beam to said laterally projecting flanges of said supports at selected adjustable heights therealong, said plurality of apertures being disposed along said rearwardly projecting flanges of at least one of said upper and lower sections of each said front support.

22. In a cargo securing system for a truck having a truck bed and an upright support at each corner of the truck bed adjacent front and rear portions thereof, a side rail for extending between the front and rear supports along each of the opposite sides of the truck bed, each said side rail comprising an elongated beam and an elongated extension element slidable along said elongated beam such that the length of each said side rail is adjustable, said elongated beam having a pair of flanges projecting laterally inwardly of the truck and toward its opposite side, means for releasably coupling said elongated beam and extension of each said rail in selected longitudinal positions relative to one another to provide side rails of selected adjusted lengths, and means carried by each of said elongated beam and said extension element for securing said elongated beam and said extension element at opposite ends of each side rail to the front and rear corner supports, respectively;

said elongated beam comprising a box beam and said extension element comprises a box tube telescopically received within said box beam, said flanges projecting laterally inwardly of said box beam and carrying a plurality of securing means for releasably securing cross beams to and between said side rails; and an extension, comprising a short box beam sized to telescopically receive at one end an end of said box tube opposite an end thereof received in said elongated box beam, a pair of flanges projecting laterally to one side of said short box beam, and means cooperable between said box tube and said short box beam for releasably securing said box tube and said short box beam to one another.

23. A cargo securing system according to claim 22 wherein end walls of said short box beam opposite said one end are inset from a corresponding end of said short box beam to define a recess.

24. A cargo securing system for a truck having a truck bed, comprising:

a front frame including a pair of generally upstanding supports for securement to the truck adjacent its opposite sides and at a front portion of the truck bed;

a rear frame including a pair of generally upstanding supports for securement to the truck adjacent its opposite sides and at a rear portion of the truck bed;

a pair of side rails each comprised of an elongated support and an extension element longitudinally adjustable relative to one another such that the side rails are adjustable in length; and means connecting each side rail at one end thereof to one of said front or rear pairs of supports whereby said rails extend therefrom;

said side rails being secured at their opposite ends to another of said front or rear pairs of supports;

each of said rear supports comprising first and second support sections releasably securable to one another, said one end of each side rail being secured to a front support, said second support section being releasably secured to an opposite end of said side rail with said second support section spaced rearwardly of said first support section forming a support area rearwardly of the truck bed.

25. A cargo securing system for a truck having a truck bed, comprising:

a front frame including a pair of generally upstanding supports for securement to the truck adjacent its opposite sides and at a front portion of the truck bed;

a rear frame including a pair of generally upstanding supports for securement to the truck adjacent its opposite sides and at a rear portion of the truck bed;

a pair of side rails each comprised of an elongated support and an extension element longitudinally adjustable relative to one another such that the side rails are adjustable in length; and means connecting each side rail at one end thereof to one of said front or rear pairs of supports whereby said rails extend therefrom;

each of said rear supports comprising first and second support sections, means for securing each said first section to said truck in a generally vertically upright position, means for securing each said second section to said truck in a generally horizontal position, elongated elements releasably secured to said second sections, respectively, to project rearwardly of said truck, at least one cross bar extending laterally between said elongated elements rearwardly of the truck.

* * * * *